US012688825B2

(12) United States Patent
Son et al.

(10) Patent No.: US 12,688,825 B2
(45) Date of Patent: Jul. 21, 2026

(54) DISPLAY PANEL, PIXEL CIRCUIT ARRANGED THEREIN AND DISPLAY DEVICE INCLUDING THE SAME

(71) Applicant: LG Display Co., Ltd., Seoul (KR)

(72) Inventors: Ki Min Son, Paju-si (KR); Ki Bok Park, Paju-si (KR); Chang Hee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/539,482

(22) Filed: Dec. 14, 2023

(65) Prior Publication Data

US 2024/0257749 A1 Aug. 1, 2024

(30) Foreign Application Priority Data

Jan. 30, 2023 (KR) ........................ 10-2023-0011423
Sep. 15, 2023 (KR) ........................ 10-2023-0122968

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0452* (2013.01); *G09G 2300/0852* (2013.01); *G09G 2300/0861* (2013.01); *G09G 2310/061* (2013.01); *G09G 2310/08* (2013.01)

(58) Field of Classification Search
CPC ............... G09G 3/3233; G09G 3/3266; G09G 2300/0452; G09G 2300/0852; G09G 2300/0861; G09G 2310/061; G09G 2310/08; G09G 3/325
See application file for complete search history.

(56) References Cited

U.S. PATENT DOCUMENTS 10,692,430 B2 * 6/2020 Kim ..................... G09G 3/3233
10,971,071 B2 4/2021 Shim
11,315,494 B2 4/2022 Kang et al.
11,322,087 B1 * 5/2022 Beard .................. G09G 3/3233
(Continued)

FOREIGN PATENT DOCUMENTS

JP 2009037099 A 2/2009
JP 2009109519 A 5/2009
(Continued)

*Primary Examiner* — Ibrahim A Khan
(74) *Attorney, Agent, or Firm* — Seed Intellectual Property Law Group LLP

(57) ABSTRACT

Disclosed are a display panel, a pixel circuit arranged therein and a display device including the same. The display panel includes a sub-pixel of a first color, a sub-pixel of a second color, and a sub-pixel of a third color. Each of the sub-pixels of the first color, the second color, and the third color includes: a driving element including a first electrode coupled to a first node, a gate electrode coupled to a second node, and a second electrode coupled to a third node. The display panel includes a light emitting element including an anode electrode connected to the fourth node and configured to be driven by a current from the driving element; a first capacitor connected between the second node and the third node; and a second capacitor coupled between a constant voltage line and the third node or between the third node and the fourth node.

18 Claims, 9 Drawing Sheets

(56) References Cited

U.S. PATENT DOCUMENTS

| | | | | |
|---|---|---|---|---|
| 2009/0284511 | A1* | 11/2009 | Takasugi | G09G 3/3283 345/76 |
| 2012/0313923 | A1 | 12/2012 | Minami et al. | |
| 2015/0243203 | A1* | 8/2015 | Kim | G09G 3/2092 345/212 |
| 2015/0243220 | A1* | 8/2015 | Kim | H10D 86/471 345/215 |
| 2016/0012779 | A1 | 1/2016 | Gu et al. | |
| 2016/0171930 | A1* | 6/2016 | Song | G09G 3/3225 345/77 |
| 2016/0240565 | A1* | 8/2016 | Kim | H10D 86/481 |
| 2017/0039952 | A1 | 2/2017 | Kim | |
| 2017/0124953 | A1* | 5/2017 | Shim | G09G 3/2018 |
| 2017/0186832 | A1* | 6/2017 | Zhang | H10D 86/021 |
| 2017/0329189 | A1* | 11/2017 | Kim | G02F 1/13454 |
| 2018/0190199 | A1* | 7/2018 | Chun | G09G 3/3233 |
| 2020/0051506 | A1* | 2/2020 | Yang | G09G 3/3258 |
| 2020/0111413 | A1* | 4/2020 | Park | G09G 3/3233 |
| 2021/0320228 | A1* | 10/2021 | Kwon | G09G 3/3233 |
| 2021/0327988 | A1* | 10/2021 | Park | H10D 86/60 |
| 2022/0335897 | A1* | 10/2022 | Lai | G09G 3/3258 |
| 2023/0010212 | A1 | 1/2023 | Park et al. | |
| 2023/0029234 | A1 | 1/2023 | Son et al. | |
| 2023/0410729 | A1* | 12/2023 | Gai | G09G 3/32 |
| 2024/0046864 | A1* | 2/2024 | Zeng | G09G 3/32 |
| 2024/0046870 | A1* | 2/2024 | Chung | G09G 3/3233 |
| 2024/0206229 | A1* | 6/2024 | Min | H10K 59/131 |
| 2024/0324334 | A1* | 9/2024 | Shu | H10K 59/65 |

FOREIGN PATENT DOCUMENTS

| | | | |
|---|---|---|---|
| JP | 2012255872 | A | 12/2012 |
| JP | 2012255873 | A | 12/2012 |
| JP | 2019211688 | A | 12/2019 |
| JP | 2023010663 | A | 1/2023 |
| KR | 20160070653 | A | 6/2016 |
| KR | 20170052776 | A | 5/2017 |
| KR | 20220023176 | A | 3/2022 |
| TW | 202127424 | A | 7/2021 |

* cited by examiner

DISPLAY PANEL, PIXEL CIRCUIT ARRANGED THEREIN AND DISPLAY DEVICE INCLUDING THE SAME

CROSS-REFERENCE TO RELATED APPLICATION

This application claims priority to and the benefit of Korean Patent Application No. 10-2023-0011423, filed on Jan. 30, 2023, and Korean Patent Application No. 10-2023-0122968, filed on Sep. 15, 2023, the disclosure of which is incorporated herein by reference in its entirety.

BACKGROUND

Technical Field

The present disclosure relates to a display panel, a pixel circuit arranged therein and a display device including the same.

Description of Related Art

Electroluminescent display devices are roughly classified into inorganic light-emitting display devices and organic light-emitting display devices depending on the material of the emission layer. An active matrix type organic light-emitting display device includes an organic light emitting diode (hereinafter referred to as "OLED") which emits light by itself and has the advantages of fast response speed, large luminous efficiency, luminance, and viewing angle. In the organic light-emitting display device, the OLED is formed on each of the pixels. The organic light-emitting display device has a fast response speed, excellent luminous efficiency, luminance, and viewing angle, and has an excellent contrast ratio and color reproducibility as it can express black grayscales in full black.

There may be differences in electrical characteristics of driving elements across the pixels due to process deviations and device characteristic deviations resulting from the manufacturing process of display panels. These deviations in the electrical characteristics of the driving elements may increase as the driving time of the pixels elapses. To compensate for the deviations in the electrical characteristics of the driving elements across the pixels, internal compensation circuits may be added to pixel circuits. An internal compensation circuit may sense a threshold voltage of the driving element, store it in a capacitor, and compensate a gate voltage of the driving element by the threshold voltage of the driving element.

BRIEF SUMMARY

The internal compensation circuit may be divided into a source follower circuit and a diode connection circuit. The source follower circuit has the advantage of securing sufficient sensing time by separating the sensing time of the threshold voltage of the driving device and the addressing time (or data writing time) during which pixel data is written into the pixel. The inventors have realized, however, there may be a loss of data voltage in the source follower circuit. The various embodiments of the present disclosure have been made in an effort to address the various technical problems in the related art including the aforementioned drawbacks.

The present disclosure provides a display panel capable of preventing loss of data voltage, and a display device including the display panel.

It should be noted that objects of the present disclosure are not limited to the above-described objects, and other objects of the present disclosure will be apparent to those skilled in the art from the following descriptions.

A display panel according to one embodiment of the present disclosure includes: a sub-pixel of a first color; a sub-pixel of a second color; and a sub-pixel of a third color. Each of the sub-pixels of first color, the second color and the third color includes: a driving element including a first electrode connected to a first node, a gate electrode connected to a second node, and a second electrode connected to a third node, and configured to supply a current to a light emitting element; and a second capacitor connected between a constant voltage line to which a constant voltage is applied and the third node. The second capacitor has a different capacitance for each color of the sub-pixels.

Each of the sub-pixels of the first color, the second color and the third color may further include: a first switch element including a first electrode to which a pixel driving voltage is applied, a gate electrode to which a first gate signal is applied, and a second electrode connected to the first node; and a second switch element including a first electrode connected to the third node, a gate electrode to which a second gate signal is applied, and a second electrode connected to a fourth node. The sub-pixel of the first color includes a second-first capacitor. The sub-pixel of the second color includes a second-second capacitor. The sub-pixel of the third color includes a second-third capacitor.

An anode electrode of the light emitting element may be connected to the fourth node. The first color may be red, the second color may be green, and the third color may be blue.

A capacitance of the second-third capacitor may be larger than a capacitance of each of the second-first and second-second capacitors. The capacitance of the second-second capacitor may be larger than the capacitance of the second-first capacitor.

The display panel may further include: a pattern of a first metal layer disposed on a first insulating layer and connected to the sub-pixels of the first color, the second color and the third color; a second insulating layer configured to cover the pattern of the first metal layer and the first insulating layer; patterns of a second metal layer disposed on the second insulating layer, the patterns being arranged on the sub-pixels of the first color, the second color and the third color and separated among the sub-pixels; and a third insulating layer configured to cover the patterns of the second metal layer and the second insulating layer.

The patterns of the second metal layer may include: a second-first capacitor electrode disposed in the sub-pixel of the first color; a second-second capacitor electrode disposed in the sub-pixel of the second color; and a second-third capacitor electrode disposed in the sub-pixel of the third color. The second-third capacitor electrode may be larger than each of the second-first capacitor electrode and second-second capacitor electrode in size. The second-second capacitor electrode may be larger than the second-first capacitor electrode in size.

A constant voltage applied to the second-first to second-third capacitors may be equal to or different from the pixel driving voltage.

Each of the sub-pixels of the first color, the second color and the third color may further include: a third switch element including a first electrode connected to a data line to which a data voltage of pixel data is applied, a gate electrode to which a third gate signal is applied, and a second electrode connected to the second node; a fourth switch element including a first electrode to which an initialization voltage is applied, a gate electrode to which a fourth gate signal is applied, and a second electrode connected to the second node; a fifth switch element including a first electrode to which a reference voltage is applied, a gate electrode to which a fifth gate signal is applied, and a second electrode connected to the fourth node; and a first capacitor connected between the second node and the third node. The first capacitors in the sub-pixels of the first, the second color and the third color may have the same capacitance.

A pixel circuit arranged in each of the sub-pixels of the first color, the second color and the third color may be driven in an order of an initialization period, a sensing period, a data writing period, an anode reset period, and an emission period. A voltage of the first gate signal may be a gate-on voltage during the initialization period, the sensing period, and the emission period, and a gate-off voltage during the anode reset period, and the gate-on voltage or the gate-off voltage during the data writing period. A voltage of the second gate signal may be the gate-on voltage during the initialization period, the anode reset period, and the emission period, and the gate-off voltage during the sensing period and the data writing period. A voltage of the third gate signal may be the gate-on voltage during the data writing period, and the gate-off voltage during the initialization period, the sensing period, the anode reset period, and the emission period. A voltage of the fourth gate signal may be the gate-on voltage during the initialization period and the sensing period, and the gate-off voltage during the data writing period, the anode reset period, and the emission period. A voltage of the fifth gate signal may be the gate-on voltage during the initialization period, the sensing period, the data writing period, and the anode reset period, and the gate-off voltage during the emission period. Each of the first to fifth switch elements may be turned on based on the gate-on voltage, and turned off based on the gate-off voltage.

Each of the sub-pixels of the first color, the second color and the third color further may include a first switch element including a first electrode to which a pixel driving voltage is applied, a gate electrode to which a first gate signal is applied, and a second electrode connected to the first node. The sub-pixel of the first color includes a second-first capacitor. The sub-pixel of the second color includes a second-second capacitor. The sub-pixel of the third color includes a second-third capacitor. The anode electrode of the light emitting element may be connected to the third node.

The first color may be red, the second color may be green, and the third color may be blue. A capacitance of the second-first capacitor may be larger than a capacitance of each of the second-second capacitor and second-third capacitor. The capacitance of the second-second capacitor may be larger than the capacitance of the second-third capacitor.

A capacitor of the light emitting element may be increased in an order from larger to smaller of the sub-pixel of the third color, the sub-pixel of the second color, and sub-pixel of the first color.

The constant voltage applied to the second-first to second-third capacitors may be equal to or different from the pixel driving voltage.

Each of the sub-pixels of the first color, the second color and the third color may further include: a second switch element including a first electrode connected to a data line to which a data voltage of pixel data is applied, a gate electrode to which a second gate signal is applied, and a second electrode connected to the second node; a third switch element including a first electrode to which an initialization voltage is applied, a gate electrode to which a third gate signal is applied, and a second electrode connected to the second node; a fourth switch element including a first electrode to which a reference voltage is applied, a gate electrode to which a fourth gate signal is applied, and a second electrode connected to the third node; and a first capacitor connected between the second node and the third node. The first capacitors in the sub-pixels of the first color, the second color and the third color may have the same capacitance.

A display device according to one embodiment of the present disclosure includes the display panel. According to the present disclosure, it may be possible to drive the pixels at high luminance without increasing the data voltage and without expanding the data voltage range by optimizing the capacitance of the second capacitor, which is intended to reduce the loss of the data voltage, for each of the sub-pixels of the first color, the second color and the third color in the pixel circuit in which a source-follower type internal compensation circuit is included.

According to the present disclosure, the display device may realize a high luminance image with a relatively low data voltage by overcoming the driving limitations of the pixel circuit having a source-follower type internal compensation circuit.

According to the present disclosure, the size and cost of a drive IC in which an integrated data driver is integrated may be reduced, the power consumption of the drive IC may be reduced to enable low-power driving of the display device, and the amount of heat generated by the drive IC may be reduced.

The technical benefits which can be achieved by the present disclosure are not limited to the above-mentioned benefits. That is, other benefits that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
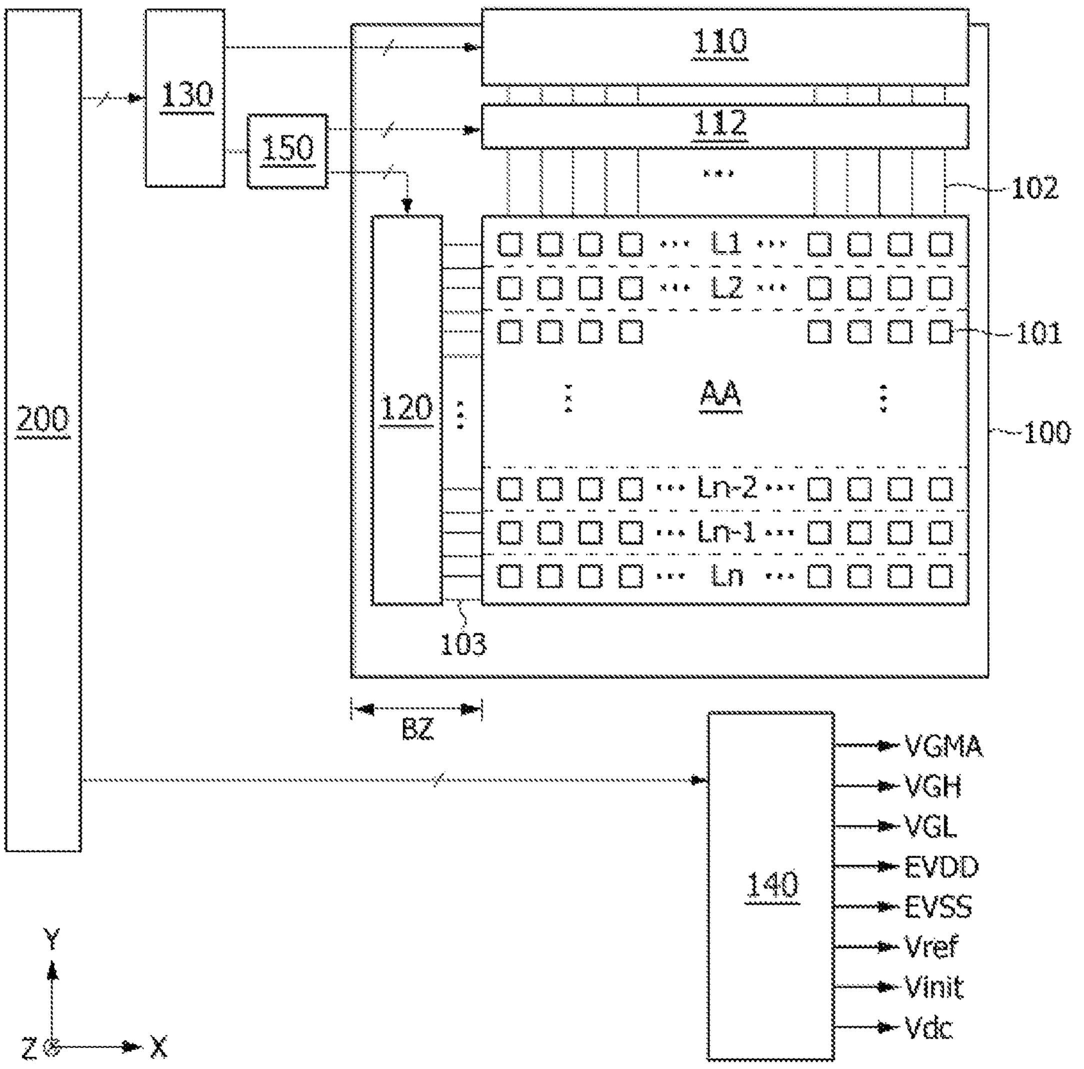
FIG. 1 is a block diagram showing a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

The term "connected" includes the meaning of "electrically connected" in some embodiments. In some embodiments, the term "connected" can also include the meaning of both "directly" and "electrically connected."

When a temporal antecedent relationship is described, such as "after," "following," "next to," "before," or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In a display device of the present disclosure, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on based on a gate-on voltage and is turned off based on a gate-off voltage. In case of an n-channel transistor, a gate-on voltage may be a gate high voltage VGH, and a gate-off voltage may be a gate low voltage VGL. In case of a p-channel transistor, a gate-on voltage may be a gate low voltage VGL, and a gate-off voltage may be a gate high voltage VGH.

Hereinafter, various embodiments of the present disclosure will be described in detail with reference to the accompanying drawings.

Figure 2:
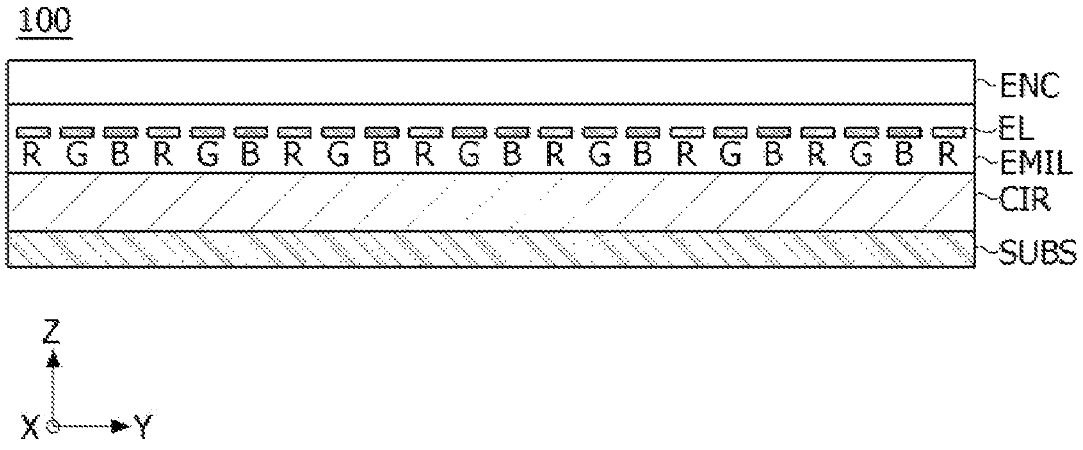
FIG. 2 is a cross-sectional view showing a cross-sectional structure of the display panel shown in FIG. 1.

FIG. 1 is a block diagram showing a display device according to one embodiment of the present disclosure. FIG. 2 is a cross-sectional view showing a cross-sectional structure of the display panel shown in FIG. 1.

Referring to FIGS. 1 to 2, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be a panel having a rectangular structure with a length in the X-axis direction, a width in the Y-axis direction, and a thickness in the Z-axis direction. A display area AA of the display panel 100 includes a pixel array for displaying an input image thereon. The pixel array includes a plurality of data lines 102, a plurality of gate lines 103 intersected with the data lines 102, and the pixels arranged in a matrix form. The display panel 100 may further include power lines commonly connected to the pixels. The power lines are connected to constant voltage lines of the pixel circuits and supply a constant voltage necessary for driving the pixels 101.

Each of the pixels 101 may be divided into a red sub-pixel, a green sub-pixel, and a blue sub-pixel for color implementation. Each of the pixels may further include a white sub-pixel. Each of the sub-pixels may include a pixel circuit implemented as a source-follower type internal compensation circuit as shown in FIGS. 6 to 9. Each of the pixel circuits is connected to a data line, a gate line, and a power line. The pixel circuit may be implemented as, but is not limited to, a circuit including a source-follower type internal compensation circuit as shown in FIGS. 6 to 9.

The pixels may be arranged in the form of real color pixels and pentile pixels. A pentile pixel may realize a higher resolution than the real color pixel by driving two sub-pixels having different colors as one pixel 101 by using a preset pixel rendering algorithm. The pixel rendering algorithm may compensate for insufficient color representation in each pixel with the color of light emitted from its adjacent pixel.

The pixel array includes a plurality of pixel lines L1 to Ln. Each of the pixel lines L1 to Ln includes one line of pixels arranged along the line direction (X-axis direction) in the pixel array of the display panel 100. The pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

The cross-sectional structure of the display panel 100 may include a circuit layer CIR, a light emitting element layer EMIL, and an encapsulation layer ENC that are stacked on a substrate SUBS, as shown in FIG. 2.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR may be implemented as, but are not limited to, an n-channel oxide TFT.

The light emitting element layer EMIL may include a light emitting element EL driven by the pixel circuit. The light emitting element EL may include a light emitting element of a red sub-pixel, a light emitting element of a green sub-pixel, and a light emitting element of a blue sub-pixel. The light emitting element layer EMIL may further include a light emitting element of white sub-pixel. The light emitting element layer EMIL in each of the sub-pixels may have a structure in which the light emitting element and a color filter are stacked. The light emitting elements EL in the light emitting element layer EMIL may be covered by multiple protective layers including an organic film and an inorganic film.

The encapsulation layer ENC covers the light emitting element layer EMIL to seal the circuit layer CIR and the light emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic film and the inorganic film are stacked in multiple layers, the movement path of moisture and oxygen becomes longer compared to a single layer, so that the penetration of moisture and oxygen that affect the light emitting element layer EMIL may be effectively blocked.

A touch sensor layer, not shown, may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are intersected, and may planarize the surface of the touch sensor layer. The polarizing plate may improve visibility and contrast ratio by converting the polarization of external light reflected by metal of the touch sensor layer and the circuit layer. The polarizing plate may be implemented as a polarizer or a circular polarizer to which a linear polarizer and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply 140 generates a DC voltage (or a constant voltage) necessary for driving the pixel array of the display panel 100 and the display panel driving circuit. The DC-DC converter may include a charge pump, a regulator, a buck converter, a boost converter, and the like. The power supply 140 may generate the constant voltages such as a gamma reference voltage VGMA, a gate-on voltage VGH, a gate-off voltage VGL, a pixel driving voltage EVDD, a cathode voltage EVSS, an initialization voltage Vinit, a reference voltage Vref, and the like by adjusting the level of a DC input voltage applied from a host system 200. The gamma reference voltage VGMA is supplied to a data driver 110. A gate-on voltage VGH and a gate-off voltage VGL are supplied to a level shifter 150 and a gate driver 120.

Constant voltages such as the pixel driving voltage EVDD, the cathode voltage EVSS, the initialization Vinit, and the reference voltage Vref are supplied to the pixels 101 via the power lines commonly connected to the pixels 101.

Figure 3A:
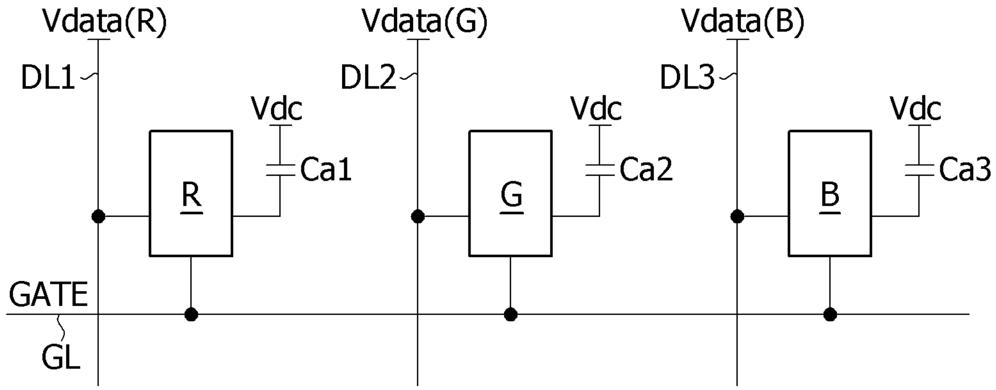
FIGS. 3A and 3B are diagrams showing the second capacitors connected to the sub-pixels.

The power supply 140 may output a constant voltage Vdc that is applied to a first electrode of the second capacitor Ca shown in FIG. 3A. The constant voltage Vdc may be a separate constant voltage, or may be replaced by a voltage such as another constant voltage applied to the pixel circuit, for example, a pixel driving voltage EVDD.

Figure 3B:
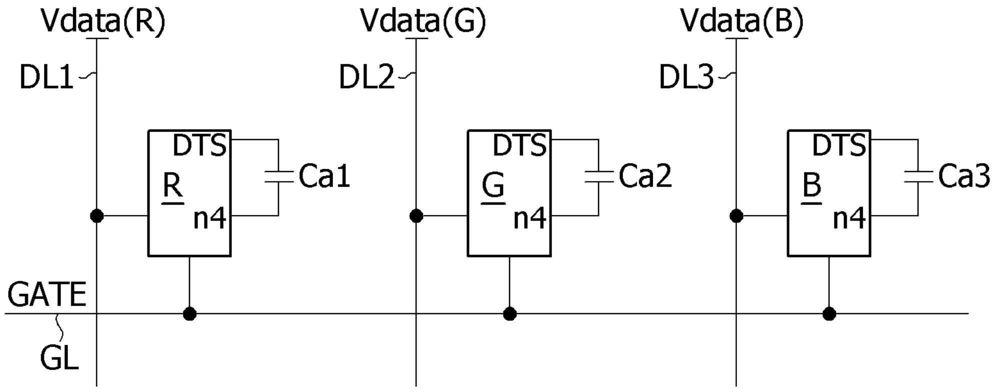

Alternatively, the first electrode of the second capacitor Ca can be coupled to the DTS node in the respective pixels as shown in FIG. 3B.

The display panel driving circuit writes the pixel data of the input image to the pixels of the display panel 100 under the control of the timing controller 130.

The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies data voltages outputted from channels of the data driver 110 to the data lines 102 using a plurality of de-multiplexers (DEMUX). A de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 1. The data driver 110 and the touch sensor driver may be integrated into one drive IC (Integrated Circuit). In mobile devices or wearable devices, the timing controller 130, the power supply 140, the data driver 110, and the like may be integrated into one drive IC.

The display panel driving circuit may operate in a low-speed driving mode under the control of the timing controller 130. In the low-speed driving mode, power consumption of the display panel 100 and the display panel driving circuit may be reduced, thereby driving the display device at a low power. The low-speed driving mode may be set to reduce the power consumption of the display device when the input images do not change for a predetermined number of frames as a result of analyzing the input images. In the low-speed driving mode, the power consumption in the display panel driving circuit and the display panel 100 may be reduced by lowering a frame frequency at which the pixel data is written to the pixels, that is, a refresh rate, when still images are inputted for a predetermined time or longer. The low-speed driving mode is not limited to a case where the still images are inputted. For example, when the display device operates in a standby mode or when a user command or an input image is not inputted to the display panel driving circuit for a predetermined time or longer, the display panel driving circuit may operate in the low-speed driving mode.

The data driver 110 receives the pixel data of the input image received as a digital signal from the timing controller 130 and outputs the data voltage. The data driver 110 converts the pixel data of the input image into a gamma compensation voltage at each frame period in a normal driving mode using a digital-to-analogue converter (DAC) and outputs the data voltage Vdata. The data driver 110 converts the pixel data of the input image into the gamma compensation voltage to output the data voltage Vdata using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensation voltage for each gray scale. The gamma compensation voltage for each grayscale is provided to the DAC in the data driver 110. The data voltage Vdata is outputted through an output buffer from each of the channels of the data driver 110.

The gate driver 120 may be implemented as a gate in panel (GIP) circuit formed in the circuit layer CIR on the display panel 100 together with the TFT array of the pixel array and wirings. The gate driver 120 may be disposed on a bezel area BZ, which is a non-display area of the display panel 100, or may be distributedly disposed in a pixel array in which an input image is reproduced.

The gate driver 120 may be disposed in a non-display area on one or both sides of the display panel 100 with the display area of the display panel interposed therebetween and may supply gate pulses to the gate lines 103 in a single feeding or double feeding method. The gate driver 120 sequentially outputs pulses of the gate signals to the gate lines 103 under the control of the timing controller 130. The gate driver 120 may sequentially supply the gate signals to the gate lines 103 by shifting the gate signals using one or more shift register.

The timing controller 130 may receive digital video data (DATA) of the input image and a timing signal synchronized therewith from the host system 200. The timing signal may include a vertical synchronization signal (Vsync), a horizontal synchronization signal (Hsync), a clock (CLK), and a data enable signal (DE). Because a vertical period and a horizontal period may be known by counting the data enable signal (DE), the vertical synchronization signal (Vsync) and the horizontal synchronization signal (Hsync) may be omitted. The data enable signal (DE) has a cycle of one horizontal period (1H).

The host system 200 may be any one of a television (TV) system, a tablet computer, a notebook computer, a navigation system, a personal computer (PC), a home theater system, a mobile device, a wearable device, or an in-vehicle system. The host system may scale an image signal from a video source to match the resolution of the display panel 100, and may transmit it to the timing controller 130 together with the timing signal.

The timing controller 130 multiplies an input frame frequency by i and controls the operation timing of the display panel driving circuit with a frame frequency of the input frame frequency×i Hz (where 'i' is a natural number). The input frame frequency is 60 Hz in a national television standards committee (NTSC) system and 50 Hz in a phase-alternating line (PAL) system.

The host system 200 or the timing controller 130 may vary the refresh rate or the frame frequency to match the movement or content characteristics of the input image, or may vary the refresh rate or the frame frequency based on the content of the input image.

The timing controller 130 reduces a frequency of refresh frames at which the pixel data is written to the pixels in the low-speed driving mode, compared to the normal driving mode. For example, the frequency of the refresh frames at which the pixel data is written to the pixels in the normal driving mode may be any one of frequencies greater than 60 Hz, such as 60 Hz, 120 Hz, 144 Hz, 240 Hz, and the refresh frame frequency in the low-speed driving mode may be a lower frequency than that in the normal driving mode. The timing controller 130 may set multiple hold frames after the refresh frames in order to lower the refresh rate of the pixels in the low-speed driving mode, thereby lowering the driving frequency of the display panel driving circuit and the pixels.

The timing controller 130 generates a data timing control signal for controlling the operation timing of the data driver 110, a multiplexer (MUX) control signal for controlling the operation timing of the de-multiplexer array 112, and a gate timing control signal for controlling the operation timing of the gate driver 120, based on the timing signals received from the host system 200. The timing controller 130 synchronizes the data driver 110, the de-multiplexer array 112, the touch sensor driver, and the gate driver 120 by controlling the operation timing of the display panel driving circuit.

The MUX control signal and the gate timing control signal outputted from timing controller 130 may be inputted to the de-multiplexer array 112 and the gate driver 120 through the level shifter 150. The level shifter 150 may receive the gate timing control signal to generate a start pulse and a shift clock. The start pulse and the shift clock outputted from the level shifter 150 may swing between the gate-on voltage VGH and the gate-off voltage VGL and may be inputted to the shift register of the gate driver 120 via clock lines (CL).

Each of the pixels 101 includes a sub-pixel of at least a first color, a sub-pixel of a second color, and a sub-pixel of a third color. Each of the sub-pixels of the first to third colors includes a driving element having a first electrode connected to a first node, a gate electrode connected to a second node, and a second electrode connected to a third node and supplying current to the light emitting element. Further, each of the sub-pixels of the first to third colors includes a second capacitor connected between a constant voltage line to which a constant voltage is applied and the third node. The capacitance of the second capacitors is set differently for each color of the sub-pixels. These features will be described in detail in the following embodiments. This second capacitor can act as a stabilization capacitor and therefore can also be referred to as a stabilization capacitor.

FIGS. 3A and 3B are diagrams showing the second capacitors connected to the sub-pixels.

Referring to FIGS. 3A and 3B, red sub-pixel R, the green sub-pixel G, and the blue sub-pixel B are connected to first data lines DL1, second data lines DL2 and third data lines DL3 to which data voltages Vdata(R), Vdata(G), and Vdata (B) are applied, and to one or more gate lines GL to which gate signals GATE are applied.

Each of the red sub-pixel R, the green sub-pixel G, and the blue sub-pixel B may include first and second capacitors. The first capacitor is omitted from FIGS. 3A and 3B. The second capacitor includes a second-first capacitor Ca1, a second-second capacitor Ca2, and a second-third capacitor Ca3.

The red sub-pixel R includes a second-first capacitor Ca1. The green sub-pixel G includes a second-second capacitor Ca2. The blue sub-pixel B includes a second-third capacitor Ca3.

The second-first capacitor Ca1, second-second capacitor Ca2, and second-third capacitor Ca3 may be connected between a node between the driving element DT and the light emitting element EL, and a constant voltage line to which a constant voltage Vdc is applied, as shown in FIGS. 6 to 9.

The second-first capacitors Ca1, second-second capacitor Ca2, and second-third capacitor Ca3 reduce a loss of the data voltage of the pixel data by increasing a transfer rate of the data voltage when the data voltage is applied to a first capacitor of the pixel circuit and a gate electrode of the driving element.

The second-first capacitors Ca1, second-second capacitor Ca2, and second-third capacitor Ca3 formed in the red sub-pixel R, the green sub-pixel G, and the blue sub-pixel B, respectively, may be designed with the same capacitance within the limited size of a pixel 101. In this case, the loss of the data voltage may occur because the second-third capacitor Ca3 in a sub-pixel that requires a large current, such as the blue sub-pixel B, has insufficient capacitance.

Figure 12:
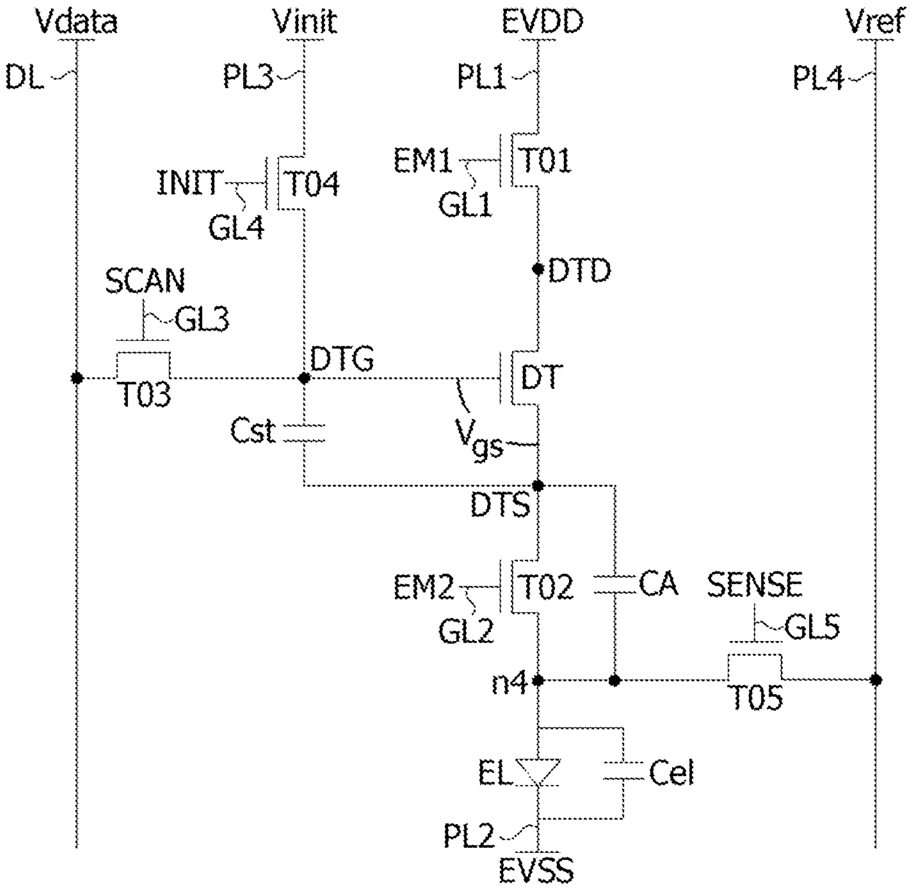
FIG. 12 is a circuit diagram showing a pixel circuit according to further another embodiment of the present disclosure.

The second capacitors Ca1, Ca2, and Ca3 may be connected between a third node DTS and a fourth node n4 as illustrated in FIG. 12 (see CA in FIG. 12). In this case, the third node DTS and the fourth node n4 may be connected by means of the second switch element T02 which is turned on during the boosting period, so that the speed of voltage boosting of the second and third nodes DTG and DTS can be increased.

The current at which the light emitting elements in the red sub-pixel R, green sub-pixel G, and blue sub-pixel B can emit light may vary from color to color. For example, the current required to drive the sub-pixels normally may be increased in the order from larger to smaller of the blue sub-pixel B, the green sub-pixel G, and the red sub-pixel R. For example, the required current for the red sub-pixel R, the green sub-pixel G, and the blue sub-pixel B at a color temperature of 6500 K may be 60 to 70 [nA] for the red sub-pixel R, 70 to 80 [nA] for the green sub-pixel G, and 150 to 160 [nA] for the blue sub-pixel B when these sub-pixels are emitted at 1600 nits.

When the second-first capacitors Ca1, second-second capacitor Ca2, and second-third capacitor Ca3 have the same capacitance, the voltage level of the data voltage outputted from the data driver 110 should be higher because the amount of loss of the data voltage in the sub-pixels is greater, and the voltage range between the minimum voltage and the maximum voltage of the data voltage should be greater. This may result in an increase in the size and cost of a drive IC in which the data driver 110 is integrated, as well as a large power consumption of the drive IC and a large amount of heat generation.

Figure 6:
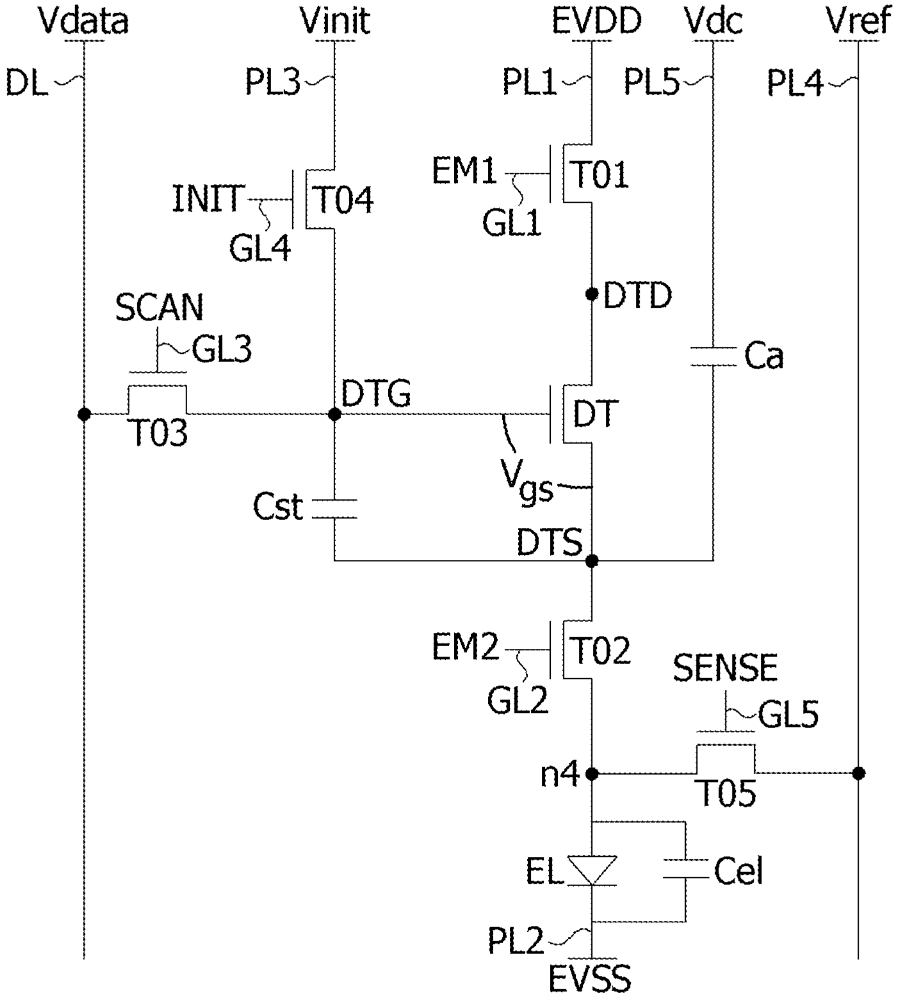
FIG. 6 is a circuit diagram showing a pixel circuit according to one embodiment of the present disclosure.

According to the present disclosure, in the case of a pixel circuit including a second switch element T02 that is switched on/off according to an emission control signal EM2 between the driving element DT and the emission element EL as shown in FIG. 6, the capacitances of the second-first capacitor Ca1, second-second capacitor Ca2, and second-third capacitor Ca3 may be set differently for each color of the sub-pixels based on different required currents in the red sub-pixel R, the green sub-pixel G, and the blue sub-pixel B. For example, the capacitance of the second-third capacitor Ca3 is larger than that of the second-first capacitor Ca1 and second-second capacitor Ca2, and the capacitance of the second-second capacitor Ca2 is larger than that of the second-first capacitor Ca1. In other words, the capacitance of the second-first capacitors Ca1, second-second capacitor Ca2, and second-third capacitor Ca3 is increased in the order from larger to smaller of the blue sub-pixel B, the green sub-pixel G, and the red sub-pixel R. In one example, the capacitance of the second-first capacitor Ca1, second-second capacitor Ca2, and second-third capacitor Ca3 may be designed to be, but not limited to, Ca1=138 [fF], Ca2=160 [fF], and Ca3=225 [fF].

Figure 8:
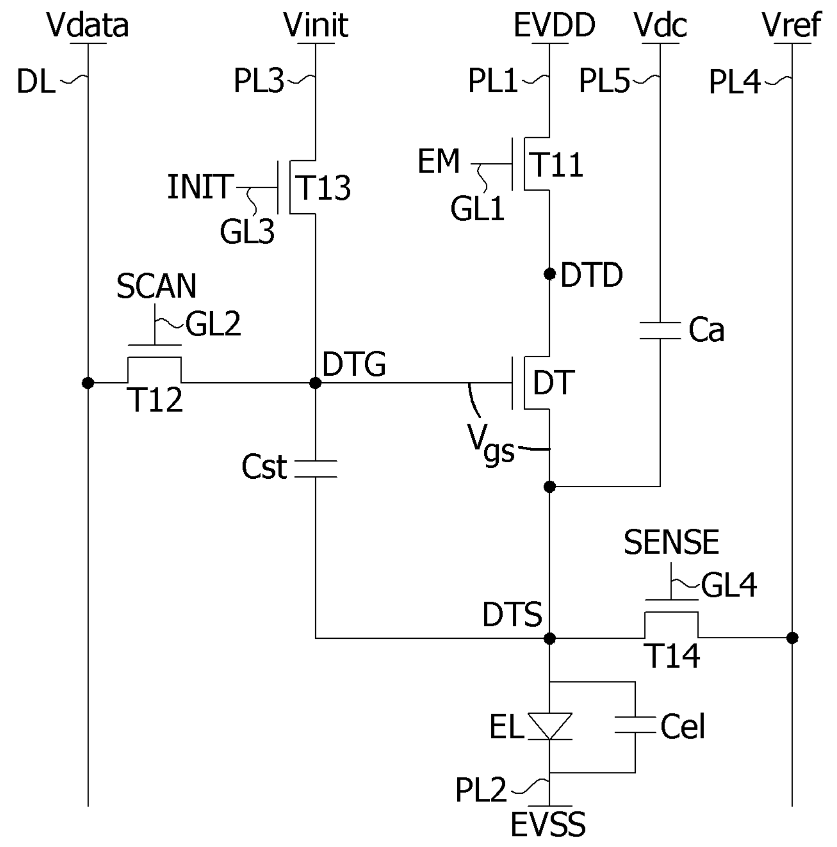
FIG. 8 is a circuit diagram showing a pixel circuit in accordance with another embodiment of the present disclosure.
Figure 9:
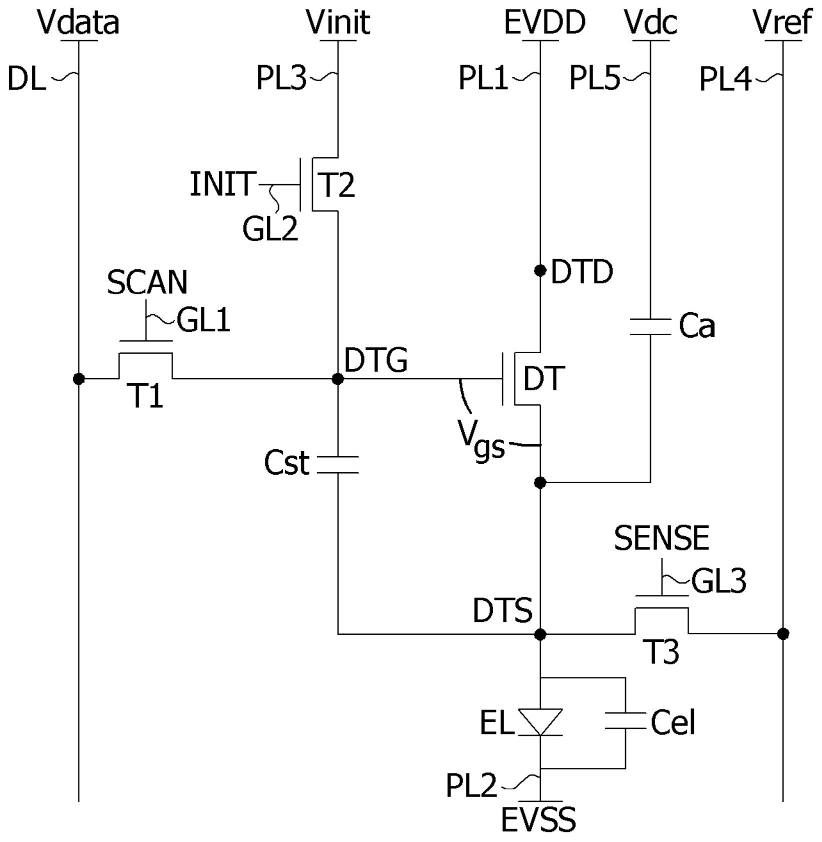
FIG. 9 is a circuit diagram showing a pixel circuit in accordance with further another embodiment of the present disclosure.

In another embodiment of the present disclosure, in the case of a pixel circuit without a switch element between the driving element DT and the light emitting element EL as shown in FIGS. 8 and 9, the capacitance of the second-first capacitor Ca1, second-second capacitor Ca2, and second-third capacitor Ca3 may be set differently for each color of the sub-pixels, taking into account the aperture ratio of the red sub-pixel R, the green sub-pixel G, and the blue sub-pixel B and the capacitance of the capacitor of the light emitting element EL. In this case, it is preferable to design the second-first capacitor Ca1, second-second capacitor Ca2, and second-third capacitor Ca3 to have larger capacitances in the order from larger to smaller of the red sub-pixel R, the green sub-pixel G, and the blue sub-pixel B.

Figure 4:
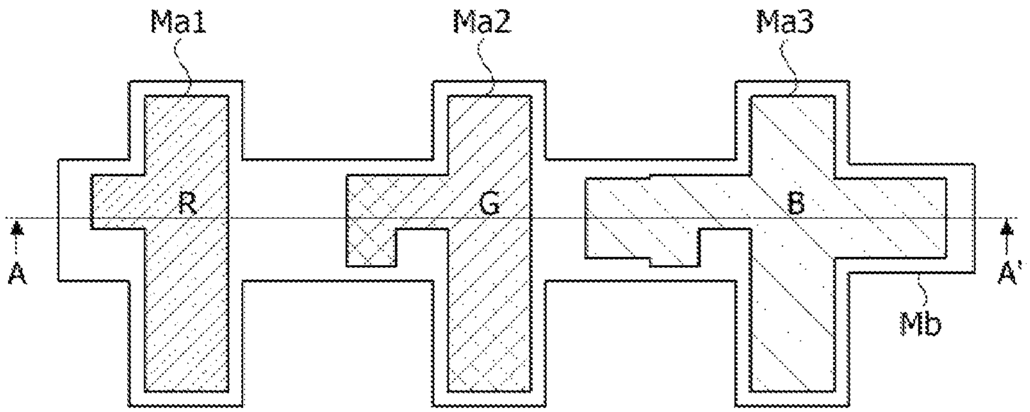
FIG. 4 is a plan view showing the color-specific second capacitors of the sub-pixels.
Figure 5:
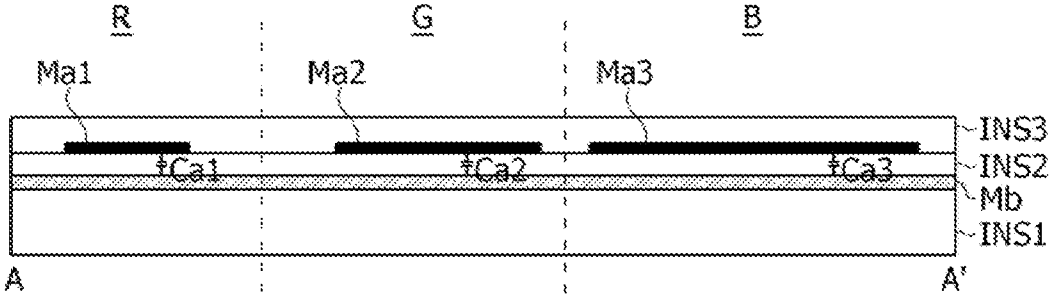
FIG. 5 is a cross-sectional view showing a cross-sectional structure of the second capacitors cut along line A-A' in FIG. 4.

FIG. 4 is a plan view showing the color-specific second capacitors of the sub-pixels. FIG. 5 is a cross-sectional view showing a cross-sectional structure of the second capacitors cut along line A-A' in FIG. 4.

Referring to FIGS. 4 and 5, the display panel 100 may include a second-first capacitor Ca1, a second-second capacitor Ca2, and a second-third capacitor Ca3. The second-first capacitor Ca1, second-second capacitor Ca2, and second-third capacitor Ca3 may be disposed in a circuit layer CIR.

The display panel 100 includes a first insulating layer INS1, a pattern Mb of a first metal layer disposed on the first insulating layer INS1, a second insulating layer INS2 covering the pattern Mb of the first metal layer and the first insulating layer INS1, patterns Ma1, Ma2, and Ma3 of a second metal layer disposed on the second insulating layer, and a third insulating layer INS3 covering the patterns Ma1, Ma2, and Ma3 of the second metal layer and the second insulating layer INS2.

The pattern Mb of the first metal layer is a common electrode (or lower electrode) of the second-first capacitor Ca1, second-second capacitor Ca2, and second-third capacitor Ca3, which is continuously connected to the red sub-pixel R, green sub-pixel G, and blue sub-pixel B and is shared among the red sub-pixel R, green sub-pixel G, and blue sub-pixel B. A constant voltage Vdc or a pixel driving voltage EVDD is applied to the pattern Mb of the first metal layer. Therefore, in the pixel circuit shown in FIGS. 6 to 9, the pattern Mb of the first metal layer includes a constant voltage line to which the constant voltage Vdc is applied, or a constant voltage line to which the pixel driving voltage EVDD is applied.

The patterns Ma1, Ma2, and Ma3 of the second metal layer are formed as independent patterns or island patterns that are separated between neighboring red sub-pixel R, green sub-pixel G, and blue sub-pixel B. The patterns Ma1, Ma2, and Ma3 of the second metal layer are divided into a second-first capacitor electrode (or top electrode) Ma1 disposed in the red sub-pixel R, a second-second capacitor electrode Ma2 disposed in the green sub-pixel G, and a second-third capacitor electrode Ma3 disposed in the blue sub-pixel B.

The second-first capacitor electrode Ma1 faces the pattern Mb of the first metal layer with the second insulating layer INS2 therebetween by overlapping the pattern Mb of the first metal layer within the red sub-pixel R. The second-second capacitor electrode Ma2 faces the pattern Mb of the first metal layer with the second insulating layer INS2 therebetween by overlapping the pattern Mb of the first metal layer within the green sub-pixel G. The second-third capacitor electrode Ma3 faces the pattern Mb of the first metal layer with the second insulating layer INS2 therebetween by overlapping the pattern Mb of the first metal layer within the blue sub-pixel B.

In the pixel circuits shown in FIGS. 6 to 9, the second-first capacitor electrode Ma1 includes a third node DTS of the red sub-pixel R. In the pixel circuits shown in FIGS. 6 to 9, the second-second capacitor electrode Ma2 includes a third node DTS of the green sub-pixel G. In the pixel circuits shown in FIGS. 6 to 9, the second-third capacitor electrode Ma3 includes a third node DTS of the blue sub-pixel B.

In order to differentially apply the capacitances of the second capacitors in the red sub-pixel R, green sub-pixel G, and blue sub-pixel B to which the pixel circuit shown in FIG. 6 is applied, the second-first capacitor electrode Ma1, the second-second capacitor electrode Ma2, and the second-third capacitor electrode Ma3 may be increased in size in the order from larger to smaller of the blue sub-pixel B, green sub-pixel G, and red sub-pixel R, respectively. In other words, the second-third capacitor electrode Ma3 may be larger than the respective sizes of the second-first capacitor electrode Ma1 and the second-second capacitor electrode Ma2, and the second-second capacitor electrode Ma2 may be larger than the second-first capacitor electrode Ma1. In still other words, Ma3 may have the largest size among Ma1, Ma2, and Ma3, Ma1 may have the smallest size among Ma1, Ma2, Ma3, and the size of Ma2 may be between those of Ma1 and Ma3.

In the case of the pixel circuit shown in FIG. 6, since the third node DTS coupled to a second node DTG with the first capacitor Cst therebetween is in a floating state, the voltage of the third node DTS may be changed due to the influence of the data voltage Vdata of the pixel data when the data voltage Vdata is applied to the second node DTG, and a loss of the data voltage Vdata may occur due to the influence of such coupling. The second-first capacitor Ca1, second-second capacitor Ca2, and second-third capacitor Ca3 reduce this loss of the data voltage Vdata. In the present disclosure, by differentially designing the capacitance of the second-first capacitor Ca1, second-second capacitor Ca2, and second-third capacitor Ca3 based on the current required by each color in the sub-pixels, it may be possible to increase the luminance of the red sub-pixel R, green sub-pixel G, and blue sub-pixel B without increasing the voltage level of the data voltage at high luminance. As a result, the present disclosure may reduce the size and cost of the drive IC in which the data driver 110 is integrated, reduce the power consumption of the drive IC to enable low-power driving of the display device, and reduce the amount of heat generated by the drive IC.

Figure 7:
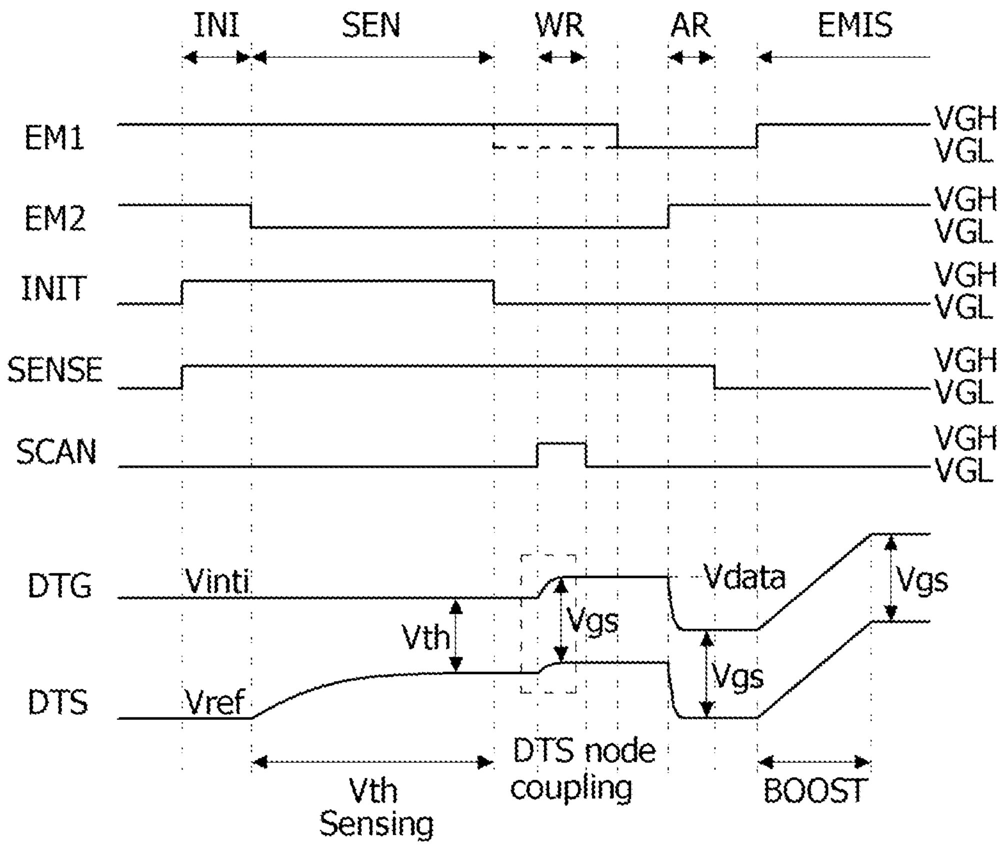
FIG. 7 is a waveform diagram showing gate signals applied to the pixel circuit shown in FIG. 6 and voltages of its main nodes.

FIG. 6 is a circuit diagram showing a pixel circuit according to one embodiment of the present disclosure. FIG. 7 is a waveform diagram showing gate signals applied to the pixel circuit shown in FIG. 6 and voltages of its main nodes.

Referring to FIGS. 6 and 7, the pixel circuit includes a light emitting element EL, a driving element DT driving the light emitting element EL, a plurality of switch elements T01 to T05, a first capacitor Cst, and a second capacitor Ca. The driving element DT and the switch elements T01 to T05 may be implemented as n-channel oxide TFTs.

The pixel circuit is connected to a data line DL to which a data voltage Vdata of pixel data is applied, and to gate lines GL1 to GL5 to which gate signals EM1, EM2, SCAN, INIT, SENSE are applied. The pixel circuit is connected to power nodes to which DC voltages (or constant voltages) are applied, such as a first constant voltage line PL1 to which a pixel driving voltage EVDD is applied, a second constant voltage line PL2 to which a cathode voltage EVSS is applied, a third constant voltage line PL3 to which an initialization voltage Vinit is applied, a fourth constant voltage line PL4 to which a reference voltage Vref is applied, and a fifth constant voltage line PL5 to which a constant voltage Vdc is applied. On the display panel 100, the power lines to which the constant voltage lines are connected may be commonly connected to all pixels. The constant voltage Vdc may be replaced by a pixel driving voltage EVDD. In this case, the fifth constant voltage line PL5 may be omitted because the second capacitor Ca is connected to the first constant voltage line PL1 to which the pixel driving voltage EVDD is applied.

A voltage level of each of the constant voltages EVDD, EVSS, Vinit, and Vref applied to the pixel circuit may be set in consideration of the voltage margin for operation in the saturation region of the driving element DT. The voltage levels of the constant voltages EVDD, EVSS, Vinit, and Vref may be set in the condition of EVDD>Vref>Vinit>EVSS. The constant voltage Vdc applied to the second capacitor Ca may be set to a voltage level greater than or equal to the reference voltage Vref.

The gate signals EM1, EM2, SCAN, INIT, and SENSE include pulses that swing between a gate-on voltage VGH and a gate-off voltage VGL. The gate-on voltage VGH may be set to a voltage level higher than the pixel driving voltage EVDD, and the gate-off voltage VGL may be set to a voltage level lower than the cathode voltage.

The gate signals EM1, EM2, SCAN, INIT, and SENSE include a first emission control signal (hereinafter referred to as "EM signal") EM1, a second EM signal EM2, a first scan signal SCAN, a second scan signal INIT, and a third scan signal SENSE. The first EM signal EM1 may be interpreted as a first gate signal, the second EM signal EM2 as a second gate signal, the first scan signal SCAN as a third gate signal, the second scan signal INIT as a fourth gate signal, and the third scan signal SENSE as a fifth gate signal.

The pixel circuit disposed in each of the sub-pixels may be driven in the following order: the initialization period INI, the sensing period SEN, the data writing period WR, the anode reset period AR, and the emission period EMIS. The initialization period INI, the sensing period SEN, the data writing period WR, the anode reset period AR, and the emission period EMIS may be defined by the waveforms of the gate signals EM1, EM2, SCAN, INIT, and SENSE. A boosting period BOOST in which voltages of the second node DTG and third node DTS are increased may be included at an initial stage of the emission period EMIS.

A voltage of the first EM signal EM1 is the gate-on voltage VGH during the initialization period INI, the sensing period SEN, and the emission period EMIS, and the gate-off voltage VGL during the anode reset period AR. The voltage of the first EM signal EM1 may be the gate-on voltage VGH or the gate-off voltage VGL during the data writing period WR. A first switch element T01 is turned on based on the gate-on voltage VGH of the first EM signal EM1 and turned off according to the gate-off voltage VGL of the first EM signal EM1.

A voltage of the second EM signal EM2 is the gate-on voltage VGH during the initialization period INI, the anode reset period AR, and the emission period EMIS, and is the gate-off voltage VGL during the sensing period SEN and the data writing period WR. The second switch element T02 is turned on based on the gate-on voltage VGH of the second EM signal EM2 and turned off according to the gate-off voltage VGL of the second EM signal EM2.

A voltage of the first scan signal SCAN is generated as a pulse of the gate-on voltage VGH synchronized with the data voltage Vdata of the pixel data during the data writing period WR, and is the gate-off voltage VGL during the other periods INI, SEN, AR, and EMIS. A third switch element T03 is turned on based on the gate-on voltage VGH of the first scan signal SCAN and turned off according to the gate-off voltage VGL of the first scan signal SCAN.

A voltage of the second scan signal INIT is generated as a pulse of the gate-on voltage VGH during the initialization period INI and the sensing period SEN, and is the gate-off voltage VGL during the other periods WR, AR, and EMIS. A fourth switch element T04 is turned on based on the gate-on voltage VGH of the second scan signal INIT and turned off according to the gate-off voltage VGL of the second scan signal INIT.

A voltage of the third scan signal SENSE is the gate-on voltage VGH during the initialization period INI, the sensing period SEN, the data writing period WR, and the anode reset period AR, and is the gate-off voltage VGL during the emission period EMIS. A fifth switch element T05 is turned on based on the gate-on voltage VGH of the third scan signal SENSE and turned off according to the gate-off voltage VGL of the third scan signal SENSE.

During the initialization period INI, the initialization voltage Vinit is applied to a second node DTG and the reference voltage Vref is applied to a third node DTS to initialize the capacitor Cst and a gate-source voltage Vgs of the driving element DT. During the sensing period SEN, a threshold voltage Vth of the driving element DT is sampled and stored in the first capacitor Cst. During the data writing period WR, the data voltage Vdata is applied to the second node DTG so that the voltage charged on the first capacitor Cst is changed to the data voltage Vdata compensated by the threshold voltage of the driving element DT. During the anode reset period AR, the reference voltage Vref is applied to the third node DTS and a fourth node n4 to suppress fluctuations in the gate-source voltage Vgs of the driving element DT in a low-speed driving mode. During the emission period EMIS, a current path is formed between the first constant voltage line PL1 and the second constant voltage line PL2, and the light emitting element EL is driven by the current generated by the gate-source voltage Vgs of the driving element DT. The light emitting element EL may be emitted according to the current from the driving element DT during the emission period EMIS after the boosting period BOOST.

The driving element DT generates a current according to the gate-source voltage Vgs to drive the light emitting element EL. The driving element DT includes a first electrode connected to a first node DTD, a gate electrode connected to the second node DTG, and a second electrode connected to the third node DTS.

The light emitting element EL may be implemented as an OLED. The light emitting element EL includes an anode electrode, a cathode electrode, and an organic compound layer formed between the anode electrode and the cathode electrode. The anode electrode of the light emitting element EL may be connected to the fourth node n4, and the cathode electrode is connected to the second constant voltage line PL2 to which the cathode voltage EVSS is applied. The light emitting element EL includes a capacitor Cel formed between the anode electrode and the cathode electrode.

The organic compound layer may include, but is not limited to, a hole injection layer (HIL), a hole transport layer (HTL), an emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the emission layer (EML). The light emitting element EL may be implemented as a tandem structure with a plurality of light emitting layers stacked on top of each other. The light emitting element EL having the tandem structure may improve the luminance and lifetime of the pixels.

The size and aperture ratio of the sub-pixels may be different for each color of the sub-pixels in consideration of the lifetime and the required current for each color, and the capacitance and size of the capacitor of the light-emitting element EL may be different for each color of the sub-pixels accordingly.

The first capacitor Cst is connected between the second node DTG and the third node DTS. The first capacitor Cst is initialized in the initialization period INI and stores the threshold voltage Vth of the driving element DT in the sensing period SEN. The capacitor Cst stores the data voltage Vdata of the pixel data compensated by the threshold voltage Vth of the driving element DT during the data writing period WR, and then maintains the gate-source voltage Vgs of the driving element DT during the anode reset period AR and the emission period EMIS.

The second capacitor Ca may be connected between the fifth constant voltage line PL5 and the third node DTS, or between the first constant voltage line PL1 and the third node DTS. During the data writing period WR, loss of the data voltage Vdata is avoided. The transfer rate of the data voltage Vdata Data DR is as shown in Equation 1 below.

$$\text{Data } DR = 1 - \frac{Cst}{Cst + C_{DTS\_hold}}, \qquad \text{[Equation 1]}$$

$$C_{DTS\_hold} = Ca + C_{DTS\_par}$$

Where $C_{DTS\_par}$ is the parasitic capacitance connected to the third node DTS.

The larger the value of $C_{DTS\_hold}$, the more the data voltage Vdata is fully transferred and the less the data voltage Vdata is lost. On the other hand, since the design area for the sub-pixels is limited, designing the second capacitors Ca in the sub-pixels with the same capacitance may cause loss of the data voltage in the sub-pixels that require large amount of current. The present disclosure makes the second capacitors Ca relatively larger in the sub-pixels that require a larger amount of current by considering the amount of current required for each color of the red sub-pixel R, green sub-pixel G, and blue sub-pixel B, thereby minimizing the loss of the data voltage in all sub-pixels and enabling the sub-pixels to emit light with high luminance without increasing the data voltage.

The first switch element T01 is connected between the first constant voltage line PL1 to which the pixel driving voltage EVDD is applied, and the first node DTD, and is turned on based on the gate-on voltage VGH of the first EM signal EM1. When the first switch element T01 is turned on, the pixel driving voltage EVDD is applied to the first node DTD. The first switch element T01 is in the off-state when the voltage of the first EM signal EM1 is the gate-off voltage VGL. The first switch element T01 includes a first electrode connected to the first constant voltage line PL1, a gate electrode connected to the first gate line GL1 to which the first EM signal EM1 is applied, and a second electrode connected to the first node DTD.

The second switch element T02 is connected between the third node DTS and the fourth node n4 and is turned on based on the gate-on voltage VGH of the second EM signal EM2. When the second switch element T02 is turned on, the third node DTS is connected to the fourth node n4. The second switch element T02 is in the off-state when the voltage of the second EM signal EM2 is the gate-off voltage VGL. The second switch element T02 includes a first electrode connected to the third node DTS, a gate electrode connected to a second gate line GL2 to which the second EM signal EM2 is applied, and a second electrode connected to the fourth node n4.

The third switch element T03 is connected between the data line DL, to which the data voltage Vdata of the pixel data is applied, and the second node DTG, and is turned on based on the gate-on voltage VGH of the first scan signal SCAN. When the third switch element T03 is turned on, the data voltage Vdata is applied to the second node DTG. The third switch element T03 is in the off-state when the voltage of the first scan signal SCAN is the gate-off voltage VGL. The third switch element T03 includes a first electrode connected to the data line DL, a gate electrode connected to a third gate line GL3 to which the first scan signal SCAN is applied, and a second electrode connected to the second node DTG.

The fourth switch element T04 is connected between the third constant voltage line PL3, to which the initialization voltage Vinit is applied, and the second node DTG, and is turned on based on the gate-on voltage VGH of the second scan signal INIT. When the fourth switch element T04 is turned on, the initialization voltage Vinit is applied to the second node DTG. The fourth switch element T04 is in the off-state when the voltage of the second scan signal INIT is the gate-off voltage VGL. The fourth switch element T04 includes a first electrode connected to the third constant voltage line PL3, a gate electrode connected to a fourth gate line GL4 to which the second scan signal INIT is applied, and a second electrode connected to the second node DTG.

The fifth switch element T05 is connected between the fourth constant voltage line PL4, to which the reference voltage Vref is applied, and the fourth node n4, and is turned on based on the gate-on voltage VGH of the third scan signal SENSE. When the fifth switch element T05 is turned on, the reference voltage Vref is applied to the fourth node n4. The fifth switch element T05 is in the off-state when the voltage of the third scan signal SENSE is the gate-off voltage VGL. The fifth switch element T05 includes a first electrode connected to the fourth constant voltage line PL4, a gate electrode connected to a fifth gate line GL5 to which the third scan signal SENSE is applied, and a second electrode connected to the fourth node n4.

A capacitance ratio of the first capacitor Cst to the second capacitors Ca may be different for each color of the red sub-pixel R, green sub-pixel G, and blue sub-pixel B. The capacitance ratio of the first capacitor Cst to the second capacitors Ca, which minimizes the loss of the data voltage and reduces the data voltage range to allow the sub-pixels to emit light with high luminance, may be 1:1.5:2 for red:green:blue at a color temperature of 6500K. For example, in the red sub-pixel R, the capacitance of the first capacitor Cst and the second capacitors Ca are equal to each other. In contrast, the capacitance of the second capacitors Ca may be 1.5 times larger than that of the first capacitor Cst in the green sub-pixel G, and the capacitance of the second capacitors Ca may be 2 times larger than that of the first capacitor Cst in the blue sub-pixel B. The first capacitor Cst may be designed to have the same capacitance in all red sub-pixel R, green sub-pixel G, and blue sub-pixel B. In this case, the capacitance of the second capacitors Ca in the red sub-pixel R, green sub-pixel G, and blue sub-pixel B may be differently applied as 1:1.5:2 for red:green:blue. The capacitance of the capacitors Ca may be determined by the size of the electrodes as shown in FIGS. 4 and 5 when the thickness of the dielectric layers of the capacitors in the sub-pixels is the same. On the other hand, the above-mentioned ratio may vary when the color temperature values are different.

FIGS. 8 and 9 are circuit diagrams showing pixel circuits according to other embodiments of the present disclosure. In the pixel circuits shown in FIGS. 8 and 9, the components that are substantially the same as in the pixel circuit of the aforementioned embodiment are designated with the same reference numerals, and a detailed description thereof will be omitted.

Referring to FIG. 8, the pixel circuit includes a light emitting element EL, a driving element DT driving the light emitting element EL, a plurality of first to fourth switch elements T11 to T14, a first capacitor Cst, and a second capacitor Ca. The driving element DT and the first to fourth switch elements T11 to T14 may be implemented as n-channel oxide TFTs.

The pixel circuit is connected to the data line DL to which the data voltage Vdata of pixel data is applied, and to the first to fourth gate lines GL1 to GL4 to which gate signals EM, SCAN, INIT, and SENSE are applied. The pixel circuit is connected to the power nodes to which DC voltages (or constant voltages) are applied, such as the first constant voltage line PL1 to which the pixel driving voltage EVDD is applied, the second constant voltage line PL2 to which the cathode voltage EVSS is applied, the third constant voltage line PL3 to which the initialization voltage Vinit is applied, the fourth constant voltage line PL4 to which the reference voltage Vref is applied, and the fifth constant voltage line PL5 to which the constant voltage Vdc is applied. On the display panel 100, the power lines to which the constant voltage lines are connected may be commonly connected to all pixels. The constant voltage Vdc may be replaced by a pixel driving voltage EVDD. In this case, the fifth constant voltage line PL5 may be omitted because the second capacitor Ca is connected to the first constant voltage line PL1 to which the pixel driving voltage EVDD is applied.

The gate signals EM, SCAN, INIT, and SENSE include an EM signal EM, a first scan signal SCAN, a second scan signal INIT, and a third scan signal SENSE. The EM signal EM may be interpreted as a first gate signal, the first scan signal SCAN as a second gate signal, the second scan signal INIT as a third gate signal, and the third scan signal SENSE as a fourth gate signal.

The operation period of the pixel circuit shown in FIG. 8 may be divided into the initialization period INI, the sensing period SEN, the data writing period WR, the anode reset period AR, and the emission period EMIS as described above. The initialization period INI, the sensing period SEN, the data writing period WR, the anode reset period AR, and the emission period EMIS may be defined by the waveforms of the gate signals EM, SCAN, INIT, and SENSE.

An anode electrode of the light emitting element EL may be connected to the third node DTS, and a cathode electrode thereof is connected to the second constant voltage line PL2 to which the cathode voltage EVSS is applied. The light emitting element EL includes the capacitor Cel formed between the anode electrode and the cathode electrode.

The first capacitor Cst is connected between the second node DTG and the third node DTS. The second capacitor Ca may be connected between the fifth constant voltage line PL5 and the third node DTS, or between the first constant voltage line PL1 and the third node DTS.

A first switch element T11 is connected between the first constant voltage line PL1, to which the pixel driving voltage EVDD is applied, and the first node DTD, and is turned on based on the gate-on voltage VGH of the EM signal EM. The first switch element T11 is in the off-state when the voltage of the EM signal EM is the gate-off voltage VGL. The EM signal EM may be equally applied as the first EM signal EM1 shown in FIG. 7. The first switch element T11 includes a first electrode connected to the first constant voltage line PL1, a gate electrode connected to the first gate line GL1 to which the EM signal EM is applied, and a second electrode connected to the first node DTD.

A second switch element T12 is connected between the data line DL and the second node DTG and is turned on based on the gate-on voltage VGH of the first scan signal SCAN shown in FIG. 7. When the second switch element T12 is turned on, the data voltage Vdata is applied to the second node DTG. The second switch element T12 is in the off-state when the voltage of the first scan signal SCAN is the gate-off voltage VGL. The second switch element T12 includes a first electrode connected to the data line DL, a gate electrode connected to the second gate line GL2 to which the first scan signal SCAN is applied, and a second electrode connected to the second node DTG.

A third switch element T13 is connected between the third constant voltage line PL3 and the second node DTG and is turned on based on the gate-on voltage VGH of the second scan signal INIT shown in FIG. 7. When the third switch element T13 is turned on, the initialization voltage Vinit is applied to the second node DTG. The third switch element T13 is in the off-state when the voltage of the second scan signal INIT is the gate-off voltage VGL. The third switch element T13 includes a first electrode connected to the third constant voltage line PL3, a gate electrode connected to the third gate line GL3 to which the second scan signal INIT is applied, and a second electrode connected to the second node DTG.

A fourth switch element T14 is connected between the fourth constant voltage line PL4 and the third node DTS and is turned on based on the gate-on voltage VGH of the third scan signal SENSE shown in FIG. 7. When the fourth switch element T14 is turned on, the reference voltage Vref is applied to the third node DTS. The fourth switch element T14 is in the off-state when the voltage of the third scan signal SENSE is the gate-off voltage VGL. The fourth switch element T14 includes a first electrode connected to the fourth constant voltage line PL4, a gate electrode connected to the fourth gate line GL4 to which the third scan signal SENSE is applied, and a second electrode connected to the third node DTS.

Referring to FIG. 9, the pixel circuit includes a light emitting element EL, a driving element DT driving the light emitting element EL, a plurality of first to third switch elements T1 to T3, a first capacitor Cst, and a second capacitor Ca. The driving element DT and the first to third switch elements T1 to T3 may be implemented as n-channel oxide TFTs.

The pixel circuit is connected to the data line DL to which the data voltage Vdata of pixel data is applied, and to the first to third gate lines GL1 to GL3 to which gate signals INIT, SCAN, and SENSE are applied. The pixel circuit is connected to the power nodes to which DC voltages (or constant voltages) are applied, such as the first constant voltage line PL1 to which the pixel driving voltage EVDD is applied, the second constant voltage line PL2 to which the cathode voltage EVSS is applied, the third constant voltage line PL3 to which the initialization voltage Vinit is applied, the fourth constant voltage line PL4 to which the reference voltage Vref is applied, and the fifth constant voltage line PL5 to which the constant voltage Vdc is applied. On the display panel 100, the power lines to which the constant voltage lines are connected may be commonly connected to all pixels. The constant voltage Vdc may be replaced by a pixel driving voltage EVDD. In this case, the fifth constant voltage line PL5 may be omitted because the second capacitor Ca is connected to the first constant voltage line PL1 to which the pixel driving voltage EVDD is applied.

The gate signals SCAN, INIT, and SENSE include a first scan signal SCAN, a second scan signal INIT, and a third scan signal SENSE. The first scan signal SCAN may be interpreted as a first gate signal, the second scan signal INIT as a second gate signal, and the third scan signal SENSE as a third gate signal.

The operation period of the pixel circuit shown in FIG. 9 may be divided into the initialization period INI, the sensing period SEN, the data writing period WR, the anode reset period AR, and the emission period EMIS as described above. The initialization period INI, the sensing period SEN, the data writing period WR, the anode reset period AR, and the emission period EMIS may be defined by the waveforms of the gate signals SCAN, INIT, and SENSE.

An anode electrode of the light emitting element EL may be connected to the third node DTS, and a cathode electrode thereof is connected to the second constant voltage line PL2 to which the cathode voltage EVSS is applied. The light emitting element EL includes the capacitor Cel formed between the anode electrode and the cathode electrode.

The first capacitor Cst is connected between the second node DTG and the third node DTS. The second capacitor Ca may be connected between the fifth constant voltage line PL5 and the third node DTS, or between the first constant voltage line PL1 and the third node DTS.

A first switch element T1 is connected between the data line DL and the second node DTG and is turned on based on the gate-on voltage VGH of the first scan signal SCAN. When the first switch element T1 is turned on, the data voltage Vdata is applied to the second node DTG. The first switch element T1 is in the off-state when the voltage of the first scan signal SCAN is the gate-off voltage VGL. A first switch element T1 includes a first electrode connected to the data line DL, a gate electrode connected to the first gate line GL1 to which the first scan signal SCAN is applied, and a second electrode connected to the second node DTG.

The second switch element T2 is connected between the third constant voltage line PL3 and the second node DTG and is turned on based on the gate-on voltage VGH of the second scan signal INIT. When the second switch element T2 is turned on, the initialization voltage Vinit is applied to the second node DTG. The second switch element T2 is in the off-state when the voltage of the second scan signal INIT is the gate-off voltage VGL. The second switch element T2 includes a first electrode connected to the third constant voltage line PL3, a gate electrode connected to the second gate line GL2 to which the second scan signal INIT is applied, and a second electrode connected to the second node DTG.

A third switch element T3 is connected between the fourth constant voltage line PL4 and the third node DTS and is turned on based on the gate-on voltage VGH of the third scan signal SENSE. When the third switch element T3 is turned on, the reference voltage Vref is applied to the third node DTS. The third switch element T3 is in the off-state when the voltage of the third scan signal SENSE is the gate-off voltage VGL. The third switch element T3 includes a first electrode connected to the fourth constant voltage line PL4, a gate electrode connected to the third gate line GL3 to which the third scan signal SENSE is applied, and a second electrode connected to the third node DTS.

In the case of the pixel circuits illustrated in FIGS. 8 and 9, there is no switch element between the driving element DT and the light emitting element EL. In this case, since the second capacitor Ca and the capacitor Cel of the light emitting element EL are connected to the third node DTS during the data writing period WR, the second capacitor Ca and the capacitor Cel may affect the transfer rate of the data voltage Vdata. For the pixel circuits shown in FIGS. 8 and 9, $C_{DTS\_hold}$ in Equation 1 may be expressed as follows:

$$C_{DTS\_hold} = Ca + C_{el}$$

The size of the light emitting element EL is limited within the size of the red sub-pixel R, green sub-pixel G, and blue sub-pixel B. Therefore, the capacitor Cel of the light emitting element EL is affected by the aperture ratio of the red sub-pixel R, green sub-pixel G, and blue sub-pixel B. The aperture ratio of the red sub-pixel R, green sub-pixel G, and blue sub-pixel B are applied differently for each color, taking into account the lifetime of the light emitting element EL. In the red sub-pixel R, green sub-pixel G, and blue sub-pixel B, the blue sub-pixel B, which is the most concerned about its lifetime, is larger than the sub-pixels of other colors. Therefore, the capacitance of the capacitor Cel of the light emitting element EL formed in the blue sub-pixel B is larger than that of the sub-pixels R and G of other colors. For example, the aperture ratio of the sub-pixels may be 1:3 to 4:5 to 6 for red:green:blue at a color temperature of 6500 K. The capacitance of the capacitor Cel of the light emitting element EL is increased in the order from larger to smaller of the blue sub-pixel B, the green sub-pixel G, and the red sub-pixel R depending on the aperture ratio of these sub-pixels for each color. Therefore, since the capacitance of the capacitor Cel of the light emitting element EL in the red sub-pixel R is smaller than that of the sub-pixels G and B of other colors, the transfer loss of the data voltage may be larger.

For the pixel circuits shown in FIGS. 8 and 9, it is preferred to increase the capacitance of the second capacitor Ca in the order from larger to smaller of the red sub-pixel R, the green sub-pixel G, and the blue sub-pixel B, taking into account the different aperture ratios of the sub-pixels for each color. For example, the capacitance of the second capacitor Ca in the red sub-pixel R, the green sub-pixel G, and the blue sub-pixel B, to which the pixel circuits shown in FIGS. 8 and 9 are applied, may be applied differentially as 2:1.5:1 for red:green:blue, but is not limited thereto. The above-mentioned ratio may vary when the color temperature values are different.

Figure 10:
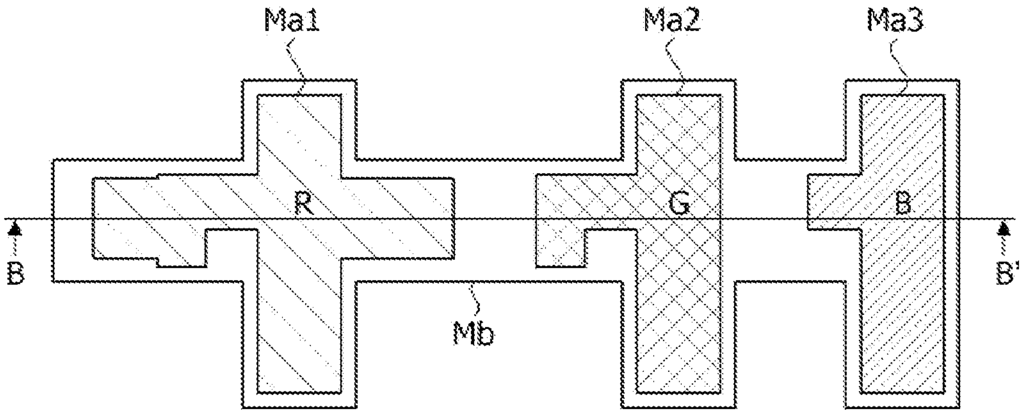
FIG. 10 is a plan view showing the color-specific second capacitors of the sub-pixels to which the pixel circuit shown in FIGS. 8 and 9 is applied.
Figure 11:
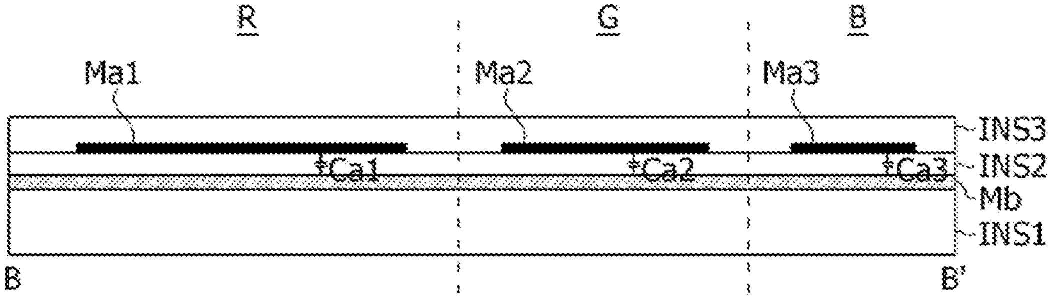
FIG. 11 is a cross-sectional view showing a cross-sectional structure of the second capacitors cut along the line B-B' in FIG. 10.

FIG. 10 is a plan view showing the color-specific second capacitors of the sub-pixels to which the pixel circuit shown in FIGS. 8 and 9 is applied. FIG. 11 is a cross-sectional view showing a cross-sectional structure of the second capacitors cut along the line B-B' in FIG. 10.

Referring to FIGS. 10 and 11, the display panel 100 may include the second-first capacitor Ca1, second-second capacitor Ca2, and second-third capacitor Ca3.

A pattern Mb of a first metal layer is a common electrode (or lower electrode) of the second-first capacitor Ca1, second-second capacitor Ca2, and second-third capacitor Ca3, which is continuously connected to the red sub-pixel R, the green sub-pixel G, and the blue sub-pixel B and is shared among the red sub-pixel R, the green sub-pixel G, and the blue sub-pixel B. A constant voltage Vdc or a pixel driving voltage EVDD is applied to the pattern Mb of the first metal layer. Therefore, in the pixel circuit shown in FIGS. 8 and 9, the pattern Mb of the first metal layer includes a constant voltage line to which a constant voltage Vdc is applied, or a constant voltage line to which a pixel driving voltage EVDD is applied.

Patterns Ma1, Ma2, and Ma3 of a second metal layer are formed as independent patterns or island patterns that are separated between neighboring red sub-pixel R, the green sub-pixel G, and the blue sub-pixel B. The patterns of the second metal layer are divided into a second-first capacitor electrode (or top electrode) Ma1 disposed in the red sub-pixel R, a second-second capacitor electrode Ma2 disposed in the green sub-pixel G, and a second-third capacitor electrode Ma3 disposed in the blue sub-pixel B.

The second-first capacitor electrode Ma1 faces the pattern Mb of the first metal layer with a second insulating layer INS2 therebetween by overlapping the pattern Mb of the first metal layer within the red sub-pixel R. The second-second capacitor electrode Ma2 faces the pattern Mb of the first metal layer with the second insulating layer INS2 therebetween by overlapping the pattern Mb of the first metal layer within the green sub-pixel G. The second-third capacitor electrode Ma3 faces the pattern Mb of the first metal layer with the second insulating layer INS2 therebetween by overlapping the pattern Mb of the first metal layer within the blue sub-pixel B.

In the pixel circuits shown in FIGS. 8 and 9, the second-first capacitor electrode Ma1 includes a third node DTS of the red sub-pixel R. In the pixel circuits shown in FIGS. 8 and 9, the second-second capacitor electrode Ma2 includes a third node DTS of the green sub-pixel G. In the pixel circuits shown in FIGS. 8 and 9, the second-third capacitor electrode Ma3 includes a third node DTS of the blue sub-pixel B.

For the red sub-pixel R, the green sub-pixel G, and the blue sub-pixel B to which the pixel circuits shown in FIGS. 8 and 9 are applied, the capacitor electrodes may be increased in size in the order from larger to smaller of the red sub-pixel R, the green sub-pixel G, and the blue sub-pixel B. In other words, the second-first capacitor electrode Ma1 may be larger than the second-second capacitor electrode Ma2 and the second-third capacitor electrode Ma3, and the second-second capacitor electrode Ma2 may be larger than the second-third capacitor electrode Ma3. In still other words, Ma1 may have the largest size among Ma1, Ma2, and Ma3, Ma3 may have the smallest size among Ma1, Ma2, Ma3, and the size of Ma2 may be between those of Ma1 and Ma3.

Figure 13:
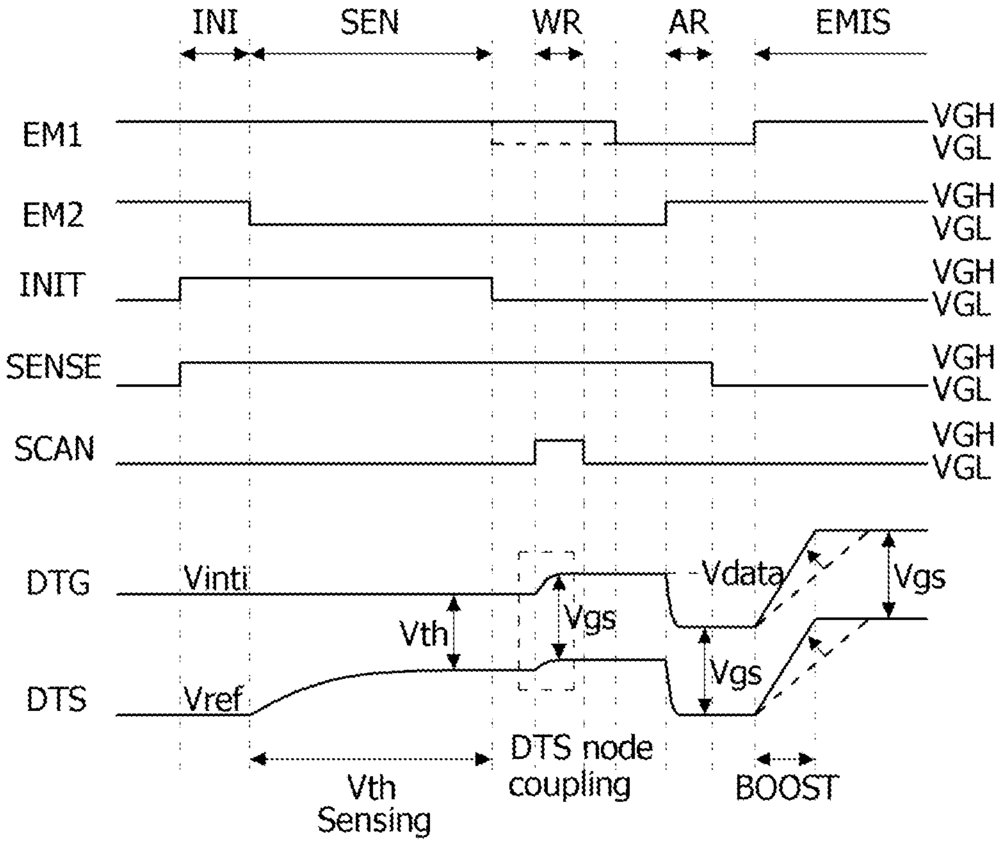
FIG. 13 is a waveform diagram showing gate signals and voltages at various nodes for the pixel circuit shown in FIG. 12.

FIG. 12 is a circuit diagram showing a pixel circuit according to further another embodiment of the present disclosure. FIG. 13 is a waveform diagram showing gate signals applied to the pixel circuit shown in FIG. 12 and voltages of its main nodes. In the pixel circuit shown in FIG. 12, the components that are substantially the same as in the pixel circuit of the aforementioned embodiment are designated with the same reference numerals, and a detailed description thereof will be omitted.

Referring to FIGS. 12 and 13, the pixel circuit includes a light emitting element EL, a driving element DT driving the light emitting element EL, a plurality of switch elements T01 to T05, a first capacitor Cst, and a second capacitor CA. In some embodiments, the driving element DT and the switch elements T01 to T05 may be implemented as n-channel oxide TFTs.

The pixel circuit is connected to a data line DL to which a data voltage Vdata of pixel data is applied, and to gate lines GL1 to GL5 to which gate signals EM1, EM2, SCAN, INIT, and SENSE are applied. The pixel circuit is connected to power lines to which DC voltages (or constant voltages) are applied, such as a first constant voltage line PL1 to which a pixel driving voltage EVDD is applied, a second constant voltage line PL2 to which a cathode voltage EVSS is applied, a third constant voltage line PL3 to which an initialization voltage Vinit is applied, and a fourth constant voltage line PL4 to which a reference voltage Vref is applied. On the display panel 100, the power lines to which the constant voltage lines are connected may be commonly connected to all pixels.

A voltage level of each of the constant voltages EVDD, EVSS, Vinit, and Vref applied to the pixel circuit may be set in consideration of the voltage margin for operation in the saturation region of the driving element DT. The voltage levels of the constant voltages EVDD, EVSS, Vinit, and Vref may be set in the condition of EVDD>Vref>Vinit>EVSS.

The gate signals EM1, EM2, SCAN, INIT, and SENSE include pulses that swing between a gate-on voltage VGH and a gate-off voltage VGL. The gate-on voltage VGH may be set to a voltage level higher than the pixel driving voltage EVDD, and the gate-off voltage VGL may be set to a voltage level lower than the cathode voltage.

The gate signals EM1, EM2, SCAN, INIT, and SENSE include a first emission control signal (hereinafter referred to as "EM signal") EM1, a second EM signal EM2, a first scan signal SCAN, a second scan signal INIT, and a third scan signal SENSE. The first EM signal EM1 may be interpreted as a first gate signal, the second EM signal EM2 as a second gate signal, the first scan signal SCAN as a third gate signal, the second scan signal INIT as a fourth gate signal, and the third scan signal SENSE as a fifth gate signal.

The pixel circuit disposed in each of the sub-pixels may be driven in the following order: the initialization period INI, the sensing period SEN, the data writing period WR, the anode reset period AR, and the emission period EMIS. The initialization period INI, the sensing period SEN, the data writing period WR, the anode reset period AR, and the emission period EMIS may be defined by the waveforms of the gate signals EM1, EM2, SCAN, INIT, and SENSE. A boosting period BOOST in which voltages of the second and third nodes DTG and DTS are increased may be included at an initial stage of the emission period EMIS.

A voltage of the first EM signal EM1 is the gate-on voltage VGH during the initialization period INI, the sensing period SEN, and the emission period EMIS, and the gate-off voltage VGL during the anode reset period AR. The voltage of the first EM signal EM1 may be the gate-on voltage VGH or the gate-off voltage VGL during the data writing period WR. A first switch element T01 is turned on based on the gate-on voltage VGH of the first EM signal EM1 and turned off according to the gate-off voltage VGL of the first EM signal EM1.

A voltage of the second EM signal EM2 is the gate-on voltage VGH during the initialization period INI, the anode reset period AR, and the emission period EMIS, and is the gate-off voltage VGL during the sensing period SEN and the data writing period WR. A second switch element T02 is turned on based on the gate-on voltage VGH of the second EM signal EM2 and turned off according to the gate-off voltage VGL of the second EM signal EM2.

A voltage of the first scan signal SCAN is generated as a pulse of the gate-on voltage VGH synchronized with the data voltage Vdata of the pixel data during the data writing period WR, and is the gate-off voltage VGL during the other periods INI, SEN, AR, and EMIS. A third switch element T03 is turned on based on the gate-on voltage VGH of the first scan signal SCAN and turned off according to the gate-off voltage VGL of the first scan signal SCAN.

A voltage of the second scan signal INIT is generated as a pulse of the gate-on voltage VGH during the initialization period INI and the sensing period SEN, and is the gate-off voltage VGL during the other periods WR, AR, and EMIS. A fourth switch element T04 is turned on based on the gate-on voltage VGH of the second scan signal INIT and turned off according to the gate-off voltage VGL of the second scan signal INIT.

A voltage of the third scan signal SENSE is the gate-on voltage VGH during the initialization period INI, the sensing period SEN, the data writing period WR, and the anode reset period AR, and is the gate-off voltage VGL during the emission period EMIS. A fifth switch element T05 is turned on based on the gate-on voltage VGH of the third scan signal SENSE and turned off according to the gate-off voltage VGL of the third scan signal SENSE.

During the initialization period INI, the initialization voltage Vinit is applied to the second node DTG and the reference voltage Vref is applied to the third node DTS to initialize the capacitor Cst and a gate-source voltage Vgs of the driving element DT. During the sensing period SEN, since the second switch element T02 is turned off and the fifth switch element T05 is turned on, the current path between the third node DTS and the fourth node n4 is cut off and the reference voltage Vref is applied to an anode electrode of the light emitting element EL. This eliminates the residual charge on the light emitting element EL and prevents the ripple of the cathod voltage EVSS from affecting an anode electrode of the light emitting element EL and the third node DTS.

During the sensing period SEN, when the voltage of the third node DTS increases and thus the voltage between the second and third nodes DTG and DTS, i.e., the gate-source voltage Vgs of the driving element DT, reaches a threshold voltage Vth, the driving element DT is turned off and the threshold voltage is sampled and then stored in the first capacitor Cst.

During the data writing period WR, the data voltage Vdata is applied to the second node DTG so that the voltage charged on the first capacitor Cst is changed to the data voltage Vdata compensated by the threshold voltage of the driving element DT.

During the anode reset period AR, the reference voltage Vref is applied to the third node DTS and the fourth node n4 to suppress fluctuations in the gate-source voltage Vgs of the driving element DT in a low-speed driving mode.

During the boosting period BOOST, the voltages of the second and third nodes DTG and DTS increase up to the turn-on voltage of the light emitting element EL, and at this time the switch element T02 is turned on and the third node DTG and the fourth node n4 are connected to be unified as the same node, thereby increasing the boosting speed without being affected by the second capacitor CA connected between the third node DTS and the fourth node n4.

During the emission period EMIS, a current path is formed between the first constant voltage line PL1 and the second constant voltage line PL2, and the pixel circuit operates as a source follower circuit so that the light emitting element EL is driven by the current generated by the gate-source voltage Vgs of the driving element DT. The light emitting element EL may be emitted according to the current from the driving element DT after the boosting period BOOST during the emission period EMIS.

The voltages of the first and second EM signals EM1 and EM2 may swing between the gate-on voltage VGH and the gate-off voltage VGL in order to improve low grayscale expression in a light emission period EMIS. The voltages of the first and second EM signals EM1 and EM2 may swing at a duty ratio set by a preset PWM (Pulse Width Modulation) during the emission period EMIS.

The driving element DT generates a current according to the gate-source voltage Vgs to drive the light emitting element EL. The driving element DT includes a first electrode connected to a first node DTD, a gate electrode connected to the second node DTG, and a second electrode connected to the third node DTS.

The light emitting element EL may be implemented as an OLED. The light emitting element EL includes an anode electrode, a cathode electrode, and an organic compound layer formed between the electrodes. The anode electrode of the light emitting element EL may be connected to the fourth node n4, and the cathode electrode thereof is connected to the second constant voltage line PL2 to which the cathode voltage EVSS is applied. The light emitting element EL may include a capacitor Cel formed between the anode electrode and the cathode electrode.

The first capacitor Cst is connected between the second node DTG and the third node DTS. The first capacitor Cst is initialized in the initialization period INI, and then stores the threshold voltage Vth of the driving element DT in the sensing period SEN. The first capacitor Cst stores the data voltage Vdata of the pixel data compensated by the threshold voltage Vth of the driving element DT in the data writing period WR, and then maintains the gate-source voltage Vgs of the driving element DT during the anode reset period AR and the emission period EMIS.

The second capacitor CA is connected between the third node DTS and the fourth node n4. When the second switch element T02 is turned on in the boosting period BOOST, the third node DTS and the fourth node n4 are short-circuited by means of the second switch element T02 to be turned on and become substantially unified as the same node, and thus charges are discharged from the second capacitor CA and no additional charges are charged. Consequently, the voltage boosting of the second and third nodes DTG and DTS during the boosting period BOOST is not affected by the second capacitor CA connected between the third node DTS and the fourth node n4. As a result, the speed of voltage boosting of the second node DTG and the third node DTS is faster, thereby shortening the boosting period BOOST.

The shortening of the boosting period BOOST reduces the luminance sensitivity of the light emitting element EL in accordance with changes in the voltage of the third node DTS because the amount of current in the light emitting element EL increases rapidly. This has a result such as the effect of increasing an S-factor of the driving element DT. The S-factor may be interpreted as "sub-threshold slope". As the S-factor increases, the luminance and chrominance of the pixels in the low greyscale region may be uniformly controlled because the luminance of the light emitting element EL does not change sensitively to deviations in the threshold voltage and/or mobility of the driving element, deviations in the capacity of the first capacitor Cst, and deviations in the constant voltage EVDD, EVSS, Vinit, Vref that cause image quality degradation in the low greyscale region.

The amount of current in the light emitting element EL may be quickly increased due to the shortened boosting period BOOST. The shortening of the boosting period BOOST not only improves the image quality when the pixels are driven at low greyscale, i.e., low luminance, but also improves the power consumption of the display devices by allowing the data voltage Vdata to be lowered without degrading the image quality.

The first switch element T01 is connected between the first constant voltage line PL1 to which the pixel driving voltage EVDD is applied and the first node DTD, and is turned on based on the gate-on voltage VGH of the first EM signal EM1. When the first switch element T01 is turned on, the pixel driving voltage EVDD is applied to the first node DTD. The first switch element T01 is in the off-state when the voltage of the first EM signal EM1 is the gate-off voltage VGL. The first switch element T01 includes a first electrode connected to the first constant voltage line PL1, a gate electrode connected to a first gate line GL1 to which the first EM signal EM1 is applied, and a second electrode connected to the first node DTD.

The second switch element T02 is connected between the third node DTS and the fourth node n4 and is turned on based on the gate-on voltage VGH of the second EM signal EM2. When the second switch element T02 is turned on, the third node DTS is connected to the fourth node n4. The second switch element T02 is in the off-state when the voltage of the second EM signal EM2 is the gate-off voltage VGL. The second switch element T02 includes a first electrode connected to the third node DTS, a gate electrode connected to a second gate line GL2 to which the second EM signal EM2 is applied, and a second electrode connected to the fourth node n4.

The third switch element T03 is connected between the data line DL, to which the data voltage Vdata of the pixel data is applied, and the second node DTG, and is turned on based on the gate-on voltage VGH of the first scan signal SCAN. When the third switch element T03 is turned on, the data voltage Vdata is applied to the second node DTG. The third switch element T03 is in the off-state when the voltage of the first scan signal SCAN is the gate-off voltage VGL. The third switch element T03 includes a first electrode connected to the data line DL, a gate electrode connected to a third gate line GL3 to which the first scan signal SCAN is applied, and a second electrode connected to the second node DTG.

The fourth switch element T04 is connected between the third constant voltage line PL3, to which the initialization voltage Vinit is applied, and the second node DTG, and is turned on based on the gate-on voltage VGH of the second scan signal INIT. When the fourth switch element T04 is turned on, the initialization voltage Vinit is applied to the second node DTG. The fourth switch element T04 is in the off-state when the voltage of the second scan signal INIT is the gate-off voltage VGL. The fourth switch element T04 includes a first electrode connected to the third constant voltage line PL3, a gate electrode connected to a fourth gate line GL4 to which the second scan signal INIT is applied, and a second electrode connected to the second node DTG.

The fifth switch element T05 is connected between the fourth constant voltage line PL4, to which the reference voltage Vref is applied, and the fourth node n4, and is turned on based on the gate-on voltage VGH of the third scan signal SENSE. When the fifth switch element T05 is turned on, the reference voltage Vref is applied to the fourth node n4. The fifth switch element T05 is in the off-state when the voltage of the third scan signal SENSE is the gate-off voltage VGL. The fifth switch element T05 includes a first electrode connected to the fourth constant voltage line PL4, a gate electrode connected to a fifth gate line GL5 to which the third scan signal SENSE is applied, and a second electrode connected to the fourth node n4.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:
- a sub-pixel of a first color;
- a sub-pixel of a second color; and
- a sub-pixel of a third color,
- wherein each of the sub-pixels of the first color, the second color, and the third color includes:
  - a driving element including a first electrode electrically connected to a first node, a gate electrode electrically connected to a second node, and a second electrode electrically connected to a third node; and
  - a light emitting element including an anode electrode connected to the third node or a fourth node and configured to be driven by a current from the driving element;
  - a second switch element including a first electrode electrically connected to the third node, a gate electrode to which a second gate signal is applied, and a second electrode electrically connected to the fourth node;
  - a first capacitor electrically connected between the second node and the third node, wherein the first capacitors in the sub-pixels of the first color, the second color, and the third color have a same capacitance; and
  - a second capacitor electrically connected in parallel with the second switch element between the third node and the fourth node,
- wherein the second capacitor has a different capacitance for each of the sub-pixels of the first color, the second color, and the third color,
- wherein the second capacitor is electrically connected to a constant voltage line configured to supply a constant voltage,
- wherein a capacitance of a capacitor of the light emitting element is increased in an order from larger to smaller of the sub-pixel of the third color, the sub-pixel of the second color, and the sub-pixel of the first color,
- wherein the second capacitor includes:
- a common electrode extending across the sub-pixels of the first color, the second color, and the third color; and respective electrodes disposed in the sub-pixels of the first color, the second color, and the third color and having different areas from each other.

2. The display panel of claim 1, wherein each of the sub-pixels of the first color, the second color, and the third color further includes:

a first switch element including a first electrode to which a pixel driving voltage is applied, a gate electrode to which a first gate signal is applied, and a second electrode electrically connected to the first node, wherein:

the sub-pixel of the first color includes a second-first capacitor;

the sub-pixel of the second color includes a second-second capacitor;

the sub-pixel of the third color includes a second-third capacitor;

the first color is red, the second color is green, and the third color is blue;

a capacitance of the second-third capacitor is larger than a capacitance of each of the second-first capacitor and second-second capacitor; and the capacitance of the second-second capacitor is larger than the capacitance of the second-first capacitor.

3. The display panel of claim 2, further comprising:

a pattern of a first metal layer disposed on a first insulating layer and electrically connected to the sub-pixels of the first color, the second color, and the third color;

a second insulating layer configured to cover the pattern of the first metal layer and the first insulating layer;

patterns of a second metal layer disposed on the second insulating layer, the patterns being arranged on the sub-pixels of the first color, the second color, and the third color and separated among the sub-pixels; and a third insulating layer configured to cover the patterns of the second metal layer and the second insulating layer, wherein the patterns of the second metal layer includes:

a second-first capacitor electrode disposed in the sub-pixel of the first color;

a second-second capacitor electrode disposed in the sub-pixel of the second color; and a second-third capacitor electrode disposed in the sub-pixel of the third color, wherein the second-third capacitor electrode is larger than each of the second-first capacitor electrode and second-second capacitor electrode in size; and the second-second capacitor electrode is larger than the second-first capacitor electrode in size.

4. The display panel of claim 2, wherein a constant voltage applied to the second-first capacitor, the second-second capacitor and the second-third capacitor is either equal to or different from the pixel driving voltage.

5. The display panel of claim 2, wherein each of the sub-pixels of the first color, the second color, and the third color further includes:

a third switch element including a first electrode electrically connected to a data line to which a data voltage of pixel data is applied, a gate electrode to which a third gate signal is applied, and a second electrode electrically connected to the second node;

a fourth switch element including a first electrode to which an initialization voltage is applied, a gate electrode to which a fourth gate signal is applied, and a second electrode electrically connected to the second node; and a fifth switch element including a first electrode to which a reference voltage is applied, a gate electrode to which a fifth gate signal is applied, and a second electrode electrically connected to the fourth node, and wherein the first capacitors in the sub-pixels of the first color, the second color, and the third color have a same capacitance.

6. The display panel of claim 5, wherein a pixel circuit arranged in each of the sub-pixels of the first color, the second color, and the third color is driven in an order of an initialization period, a sensing period, a data writing period, an anode reset period, and an emission period;

a voltage of the first gate signal is a gate-on voltage during the initialization period, the sensing period, and the emission period, is a gate-off voltage during the anode reset period, and is the gate-on voltage or the gate-off voltage during the data writing period;

a voltage of the second gate signal is the gate-on voltage during the initialization period, the anode reset period, and the emission period, and is the gate-off voltage during the sensing period and the data writing period;

a voltage of the third gate signal is the gate-on voltage during the data writing period, and is the gate-off voltage during the initialization period, the sensing period, the anode reset period, and the emission period;

a voltage of the fourth gate signal is the gate-on voltage during the initialization period and the sensing period, and is the gate-off voltage during the data writing period, the anode reset period, and the emission period;

a voltage of the fifth gate signal is the gate-on voltage during the initialization period, the sensing period, the data writing period, and the anode reset period, and is the gate-off voltage during the emission period; and each of the first to fifth switch elements is turned on based on the gate-on voltage, and turned off based on the gate-off voltage.

7. The display panel of claim 1, wherein each of the sub-pixels of the first color, the second color, and the third color further includes:

a first switch element including a first electrode to which a pixel driving voltage is applied, a gate electrode to which a first gate signal is applied, and a second electrode electrically connected to the first node, and wherein:

the anode electrode of the light emitting element is electrically connected to the third node;

the first color is red, the second color is green, and the third color is blue;

a capacitance of the second-first capacitor is larger than a capacitance of each of the second-second capacitor and second-third capacitor; and the capacitance of the second-second capacitor is larger than the capacitance of the second-third capacitor.

8. The display panel of claim 7, wherein a constant voltage applied to the second-first capacitor, the second-second capacitor and the second-third capacitors is equal to or different from the pixel driving voltage.

9. The display panel of claim 1, wherein:

a pixel driving voltage is applied to the first node;

the anode electrode of the light emitting element is electrically connected to the third node;

the first color is red, the second color is green, and the third color is blue;

a capacitance of the second-first capacitor is larger than a capacitance of each of the second-second capacitor and second-third capacitor; and the capacitance of the second-second capacitor is larger than the capacitance of the second-third capacitor.

10. The display panel of claim 9, wherein a constant voltage applied to the second-first capacitor, the second-second capacitor and the second-third capacitor is equal to or different from the pixel driving voltage.

11. A display device, comprising:

a display panel having a plurality of data lines, a plurality of gate lines, a plurality of power lines, and a plurality of red sub-pixels, a plurality of green sub-pixels, and a plurality of blue sub-pixels;

a data driver configured to output a data voltage of pixel data to the plurality of data lines; and a gate driver configured to sequentially supply gate signals to the plurality of gate lines, wherein each of the plurality of red sub-pixels, the plurality of green sub-pixels, and the plurality of blue sub-pixels includes a pixel circuit, the pixel circuit including:

a driving element including a first electrode electrically connected to a first node to which a pixel driving voltage is applied, a gate electrode electrically connected to a second node, and a second electrode electrically connected to a third node; and a light emitting element including an anode electrode connected to the third node or a fourth node and configured to be driven by a current from the driving element;

a second switch element including a first electrode electrically connected to the third node, a gate electrode to which a second gate signal is applied, and a second electrode electrically connected to the fourth node;

a first capacitor electrically connected between the second node and the third node; and a second capacitor electrically connected in parallel with including a first electrode directly connected to the third node and a second electrode connected to the second switch element between the third node and the fourth node, and wherein the first capacitors in the plurality of red sub-pixels, the plurality of green sub-pixels, and the plurality of blue sub-pixels have a same capacitance, wherein the second capacitor is electrically connected to a constant voltage line configured to supply a constant voltage which is lower than the pixel driving voltage, wherein a capacitance of the second capacitor is different for each of the plurality of red sub-pixels, the plurality of green sub-pixels, and the plurality of blue sub-pixels, wherein the second capacitor includes:

a common electrode configured to be connected to the constant voltage line and to be extended across the sub-pixels of the first color, the second color, and the third color, and respective electrodes configured to be connected to the fourth node and be disposed in the sub-pixels of the first color, the second color, and the third color and having different areas from each other.

12. The display device of claim 11, wherein each of the sub-pixels further includes:

a first switch element including a first electrode to which a pixel driving voltage is applied, a gate electrode to which a first gate signal is applied, and a second electrode electrically connected to the first node;

a third switch element including a first electrode electrically connected to the data line to which the data voltage of the pixel data is applied, a gate electrode to which a third gate signal is applied, and a second electrode electrically connected to the second node;

a fourth switch element including a first electrode to which an initialization voltage is applied, a gate electrode to which a fourth gate signal is applied, and a second electrode electrically connected to the second node; and a fifth switch element including a first electrode to which a reference voltage is applied, a gate electrode to which a fifth gate signal is applied, and a second electrode electrically connected to the fourth node, and wherein:

the constant voltage applied to the second capacitor is equal to or different from the pixel driving voltage;

a capacitance of the first capacitors in the red sub-pixels, the green sub-pixels, and the blue sub-pixels is the same;

the capacitance of the second capacitors in the plurality of blue sub-pixels is larger than the capacitance of each of the second capacitors in the plurality of red and the plurality of green sub-pixels; and the capacitance of the second capacitors in the plurality of green sub-pixels is larger than the capacitance of the second capacitors in the plurality of red sub-pixels.

13. The display device of claim 12, wherein the display panel further includes:

a pattern of a first metal layer disposed on a first insulating layer and electrically connected to the plurality of red sub-pixels, the plurality of green sub-pixels, and the plurality of blue sub-pixels;

a second insulating layer configured to cover the pattern of the first metal layer and the first insulating layer;

patterns of a second metal layer disposed on the second insulating layer, the patterns being disposed on the plurality of red sub-pixels, the plurality of green sub-pixels, and the plurality of blue sub-pixels and being separated between neighboring sub-pixels;

a third insulating layer configured to cover the patterns of the second metal layer and the second insulating layer, wherein the patterns of the second metal layer includes:

a second-first capacitor electrode disposed in the plurality of red sub-pixels;

a second-second capacitor electrode disposed in the plurality of green sub-pixels; and a second-third capacitor electrode disposed in the plurality of blue sub-pixels, wherein the second-third capacitor electrode is larger than each of the second-first capacitor electrode and the second-second capacitor electrode in size; and the second-second capacitor electrode is larger than the second-first capacitor electrode in size.

14. A pixel circuit comprising:

a driving element including:

a first electrode electrically connected to a first node to which a pixel driving voltage is applied, a gate electrode electrically connected to a second node, and a second electrode electrically connected to a third node;

a light emitting element adjacent to the driving element, the light emitting element including:

a fourth node, and a cathode electrode to which a cathode voltage is applied;

a second switch element including:

a first electrode electrically connected to the third node, a gate electrode to which a second emission control signal is applied, and a second electrode electrically connected to the fourth node, the second switch element configured to electrically connect the third node to the fourth node based on a gate-on voltage of the second emission control signal;

a first capacitor electrically connected between the second node and the third node; and a second capacitor electrically connected in parallel with including a first electrode directly connected to the third node and a second electrode connected to the second switch element between the third node and the fourth node, wherein the pixel circuit is included in a sub-pixel of a first color, a sub-pixel of a second color, and a sub-pixel of a third color, wherein the second capacitor has a different capacitance for each of the sub-pixels of the first color, the second color, and the third color, wherein the first capacitor has a same capacitance in the sub-pixel of the first color, the sub-pixel of the second color, and the sub-pixel of the third color, wherein the second capacitor is electrically connected to a constant voltage line configured to supply a constant voltage which is lower than the pixel driving voltage, wherein a capacitance of a capacitor of the light emitting element is increased in an order from larger to smaller of the sub-pixel of the third color, the sub-pixel of the second color, and the sub-pixel of the first color, wherein a capacitance of the second capacitor is different for each pixel of different colors, wherein the second capacitor includes:

a common electrode configured to be connected to the constant voltage line and to be extended across the sub-pixels of the first color, the sub-pixel of the second color, and the sub-pixel of the third color; and respective electrodes configured to be connected to the fourth node and be disposed in the sub-pixels of the first color, the second color, and the third color and having different areas from each other.

15. The pixel circuit of claim 14, further comprising:

a first switch element including:

a first electrode electrically connected to a constant voltage line to which a pixel driving voltage is applied, a gate electrode to which a first emission control signal is applied, and a second electrode electrically connected to the first node, the first switch element configured to electrically connect the constant voltage line to the first node based on a gate-on voltage of the first emission control signal;

a third switch element including:

a first electrode to which a data voltage is applied, a gate electrode to which a first scan signal is applied, and a second electrode electrically connected to the second node, the third switch element configured to supply the data voltage to the second node based on a gate-on voltage of the first scan signal;

a fourth switch element including:

a first electrode to which an initialization voltage is applied, a gate electrode to which a second scan signal is applied, and a second electrode electrically connected to the second node, the fourth switch element configured to supply the initialization voltage to the second node based on a gate-on voltage of the second scan signal;

a fifth switch element including:

a first electrode electrically connected to the fourth node, a gate electrode to which a third scan signal is applied, and a second electrode to which a reference voltage is applied, the fifth switch element configured to supply the reference voltage to the fourth node based on a gate-on voltage of the third scan signal.

16. The pixel circuit of claim 15, wherein the pixel circuit is driven in an order of an initialization period, a sensing period, a data writing period, an anode reset period, and an emission period;

a voltage of the first emission control signal is a gate-on voltage during the initialization period, the sensing period, and the emission period, is a gate-off voltage during the anode reset period, and is the gate-on voltage or the gate-off voltage during the data writing period;

a voltage of the second emission control signal is the gate-on voltage during the initialization period, the anode reset period, and the emission period, and is the gate-off voltage during the sensing period and the data writing period;

a voltage of the first scan signal is the gate-on voltage during the data writing period, and is the gate-off voltage during the initialization period, the sensing period, the anode reset period, and the emission period;

a voltage of the second scan signal is the gate-on voltage during the initialization period and the sensing period, and is the gate-off voltage during the data writing period, the anode reset period, and the emission period;

a voltage of the third scan signal is the gate-on voltage during the initialization period, the sensing period, the data writing period, and the anode reset period, and is the gate-off voltage during the emission period; and each of the first to fifth switch elements is turned on based on the gate-on voltage and turned off based on the gate-off voltage.

17. The pixel circuit of claim 15, wherein the pixel circuit is driven in an order of an initialization period, a sensing period, a data writing period, an anode reset period, and an emission period;

during the initialization period, the initialization voltage is applied to the second node and the reference voltage is applied to the third node;

during the sensing period, a threshold voltage of the driving element is stored in the first capacitor;

during the data writing period, the data voltage is applied to the second node;

during the anode reset period, the reference voltage is applied to the third node and the fourth node; and during a boosting period of the emission period, the second switch element is turned on so that the third node and the fourth node are electrically connected to each other, and wherein the light emitting element emits light in accordance with a current from the driving element after the boosting period.

18. The pixel circuit of claim 17, wherein during the boosting period, a speed of voltage boosting of the second node and the third node is faster.

* * * * *